US012811212B2

(12) United States Patent
Cho et al.

(10) Patent No.: US 12,811,212 B2
(45) Date of Patent: Nov. 24, 2026

(54) COOLING MEMBER, AND BATTERY MODULE AND BATTERY PACK INCLUDING THE SAME

(71) Applicant: LG ENERGY SOLUTION, LTD., Seoul (KR)

(72) Inventors: Young Bum Cho, Daejeon (KR); Jae Min Yoo, Daejeon (KR); Eungyu Shin, Daejeon (KR); Seung Joon Kim, Daejeon (KR); Sanghyun Yu, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 563 days.

(21) Appl. No.: 18/280,799

(22) PCT Filed: Jul. 22, 2022

(86) PCT No.: PCT/KR2022/010792
§ 371 (c)(1),
(2) Date: Sep. 7, 2023

(87) PCT Pub. No.: WO2023/003427
PCT Pub. Date: Jan. 26, 2023

(65) Prior Publication Data

US 2024/0145807 A1 May 2, 2024

(30) Foreign Application Priority Data

Jul. 22, 2021 (KR) ........................ 10-2021-0096683
Nov. 26, 2021 (KR) ........................ 10-2021-0165252

(51) Int. Cl.
*H01M 10/613* (2014.01)
*H01M 10/6556* (2014.01)
(Continued)

(52) U.S. Cl.
CPC ..... *H01M 10/613* (2015.04); *H01M 10/6556* (2015.04); *H01M 10/6567* (2015.04); *H01M 50/233* (2021.01)

(58) Field of Classification Search
CPC ........... H01M 10/613; H01M 10/6556; H01M 10/6557
See application file for complete search history.

(56) References Cited

U.S. PATENT DOCUMENTS 10,668,832 B2 6/2020 Capati et al.
2012/0258347 A1 10/2012 Yokoyama et al.
(Continued)

FOREIGN PATENT DOCUMENTS

CN 211343085 U 8/2020
CN 211530139 U * 9/2020
(Continued)

OTHER PUBLICATIONS

European Search Report for European Application No. 22846297.4, dated Sep. 30, 2024.
(Continued)

*Primary Examiner* — Stephan J Essex
(74) *Attorney, Agent, or Firm* — Birch, Stewart, Kolasch & Birch, LLP

(57) ABSTRACT

A cooling member located in an upper part of a battery cell stack in which a plurality of battery cells are stacked includes an upper plate, a lower plate, and a coolant incorporated in an inner space between the upper plate and the lower plate. The lower plate includes a first part in which a fragile part is formed, and a second part in which the fragile part is not formed. A thickness value of the first part is smaller than a thickness value of the second part.

27 Claims, 22 Drawing Sheets

(51) Int. Cl.
*H01M 10/6567* (2014.01)
*H01M 50/233* (2021.01)

(56) References Cited

U.S. PATENT DOCUMENTS

| | | | |
|---|---|---|---|
| 2014/0079974 A1 | 3/2014 | Schmidt et al. | |
| 2018/0090728 A1 | 3/2018 | Song | |
| 2018/0248160 A1 | 8/2018 | Lee | |
| 2019/0334143 A1 | 10/2019 | Sugeno | |
| 2020/0058967 A1 | 2/2020 | Berge et al. | |
| 2020/0091564 A1 | 3/2020 | Moen et al. | |
| 2020/0101335 A1 | 4/2020 | Liu et al. | |
| 2020/0266505 A1 | 8/2020 | Park et al. | |
| 2021/0111439 A1 | 4/2021 | Moen et al. | |
| 2021/0313633 A1 | 10/2021 | Petzinger | |
| 2022/0045388 A1 | 2/2022 | Jo | |

FOREIGN PATENT DOCUMENTS

| | | | | |
|---|---|---|---|---|
| CN | 111864304 A | | 10/2020 | |
| CN | 211719658 U | | 10/2020 | |
| CN | 112531231 A | * | 3/2021 | .......... H01M 10/625 |
| CN | 212848580 U | | 3/2021 | |
| CN | 113117274 A | | 7/2021 | |
| CN | 214099696 U | | 8/2021 | |
| JP | 7-272751 A | | 10/1995 | |
| JP | 2010-97836 A | | 4/2010 | |
| JP | 2010-123349 A | | 6/2010 | |
| JP | 2012-221717 A | | 11/2012 | |
| JP | 2014-523622 A | | 9/2014 | |
| JP | 5673979 B2 | | 2/2015 | |
| JP | 2017-147128 A | | 8/2017 | |
| JP | 2018-526772 A | | 9/2018 | |
| JP | 2019-29245 A | | 2/2019 | |
| JP | 2019029245 A | * | 2/2019 | |
| JP | 2020-149900 A | | 9/2020 | |
| KR | 10-2014-0037774 A | | 3/2014 | |
| KR | 10-1583679 B1 | | 1/2016 | |
| KR | 10-2017-0072129 A | | 6/2017 | |
| KR | 10-2018-0038310 A | | 4/2018 | |
| KR | 10-2018-0108282 A | | 10/2018 | |
| KR | 10-1983639 B1 | | 5/2019 | |
| KR | 10-2019-0133689 A | | 12/2019 | |
| KR | 10-2020-0104005 A | | 9/2020 | |
| KR | 10-2020-0131618 A | | 11/2020 | |
| KR | 10-2203248 B1 | | 1/2021 | |
| WO | WO 2018/131221 A1 | | 7/2018 | |
| WO | WO 2018/137374 A1 | | 8/2018 | |
| WO | WO 2021/004860 A1 | | 1/2021 | |

OTHER PUBLICATIONS

International Search Report (PCT/ISA/210) issued in PCT/KR2022/010792, dated Nov. 2, 2022.

* cited by examiner

[FIG. 1]
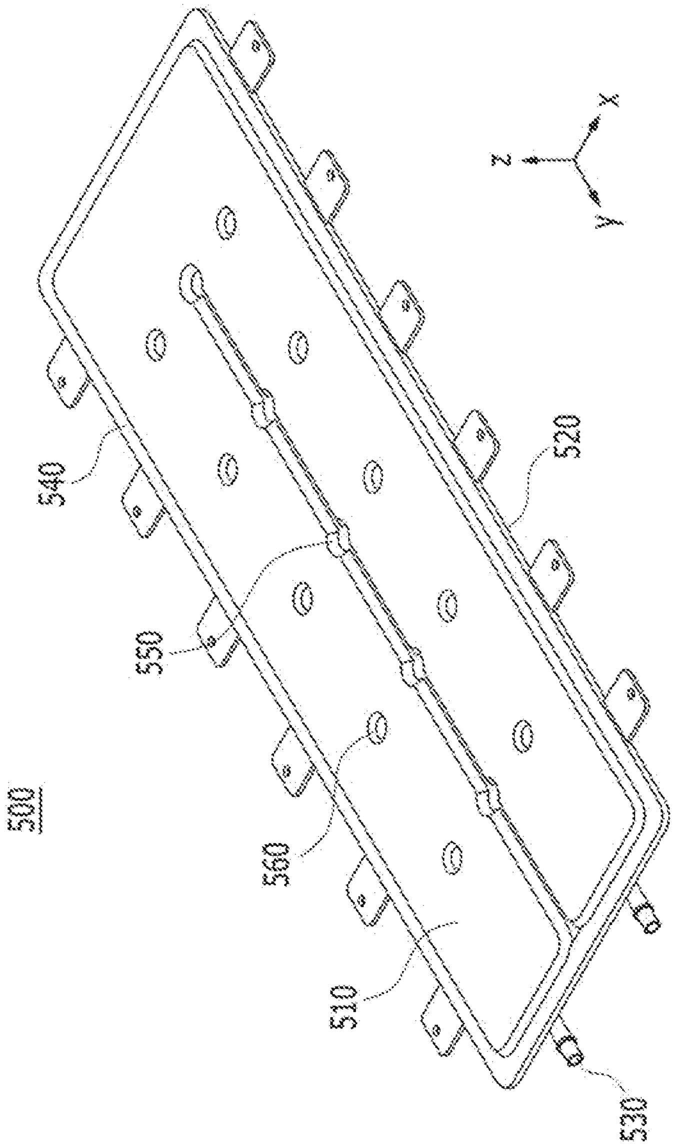

[FIG. 2]
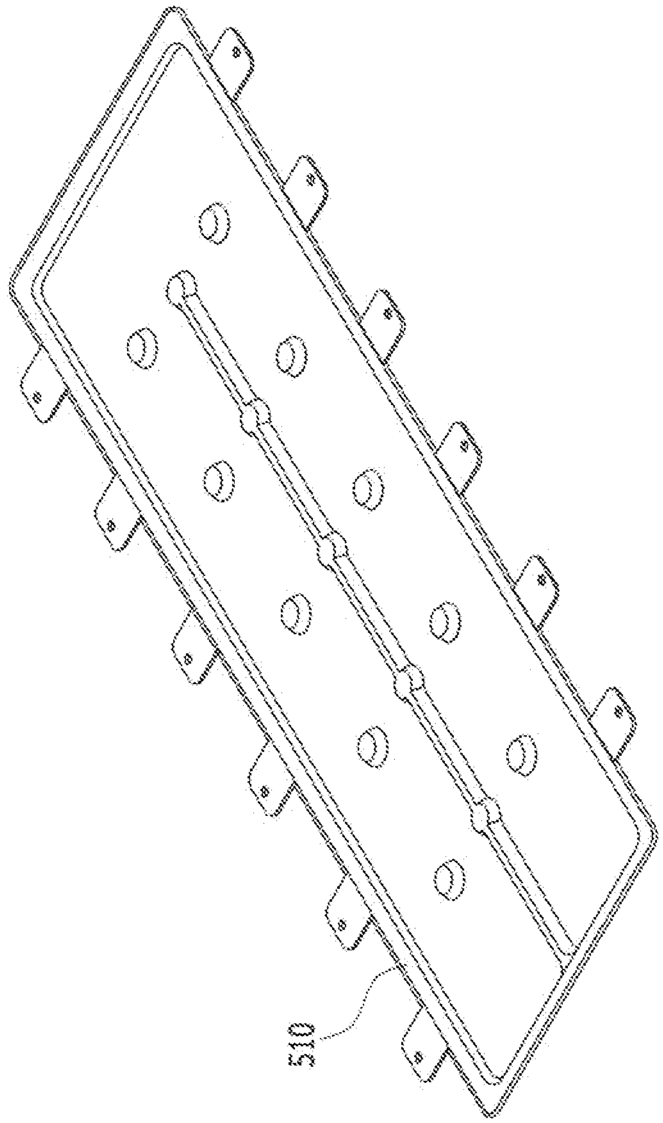

[FIG. 3]
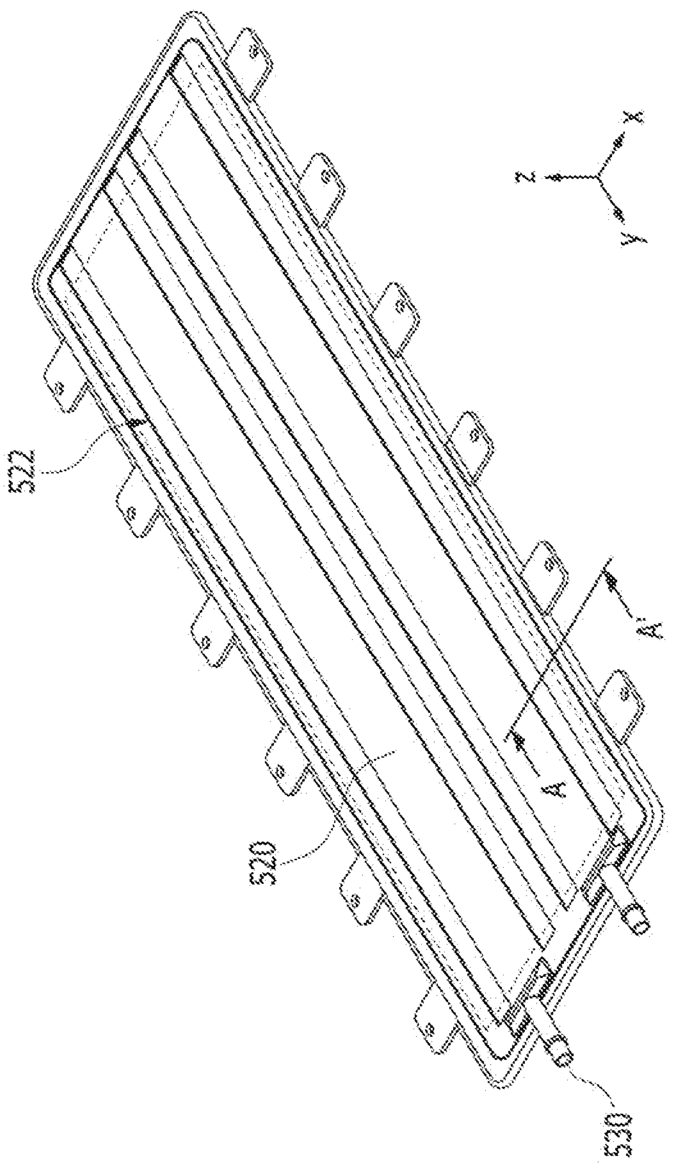

【FIG. 4】
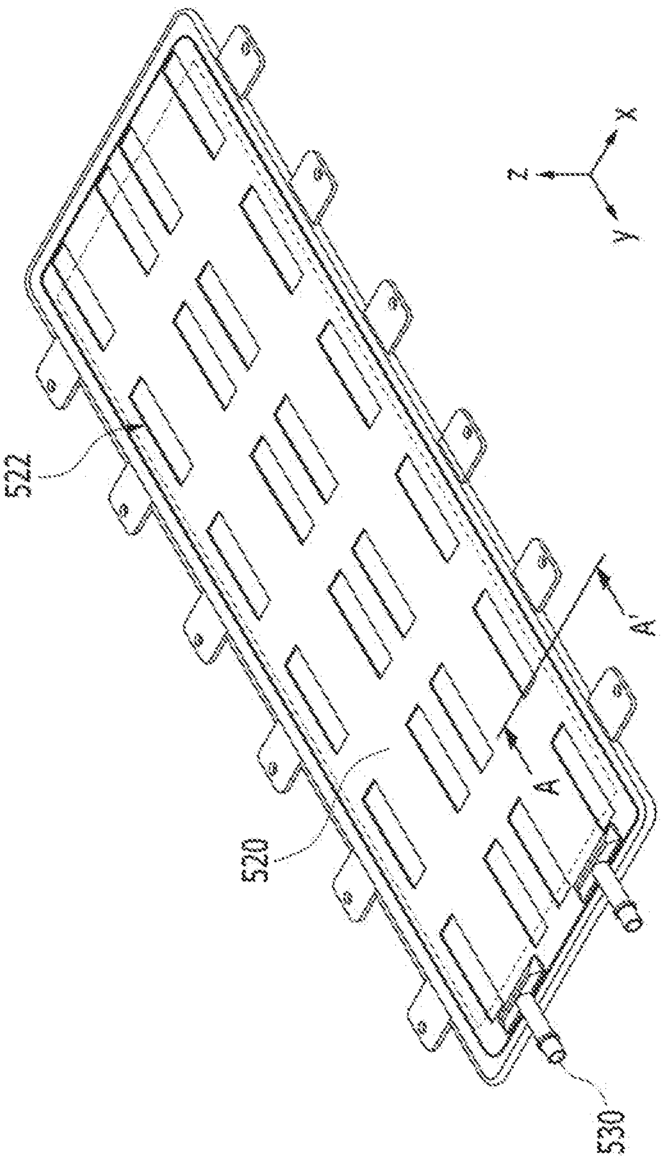

[FIG. 5]
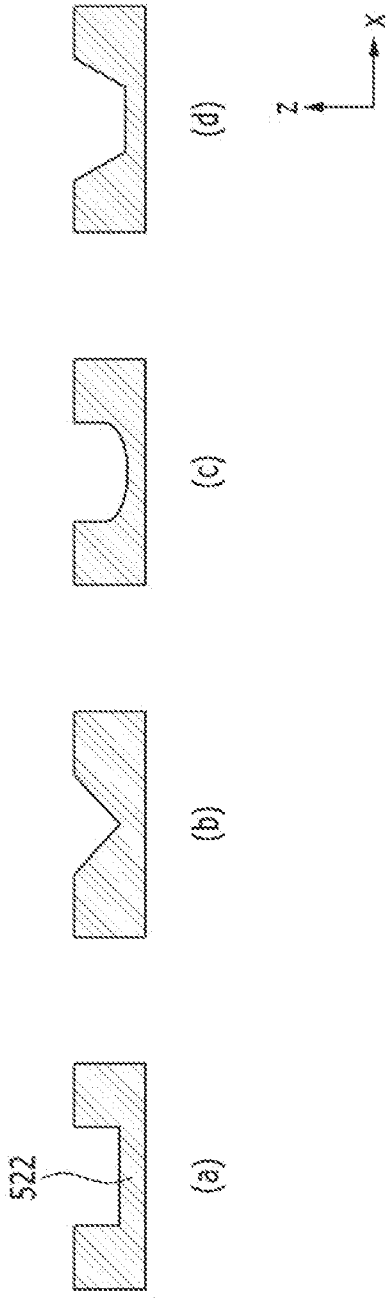

【FIG. 6】
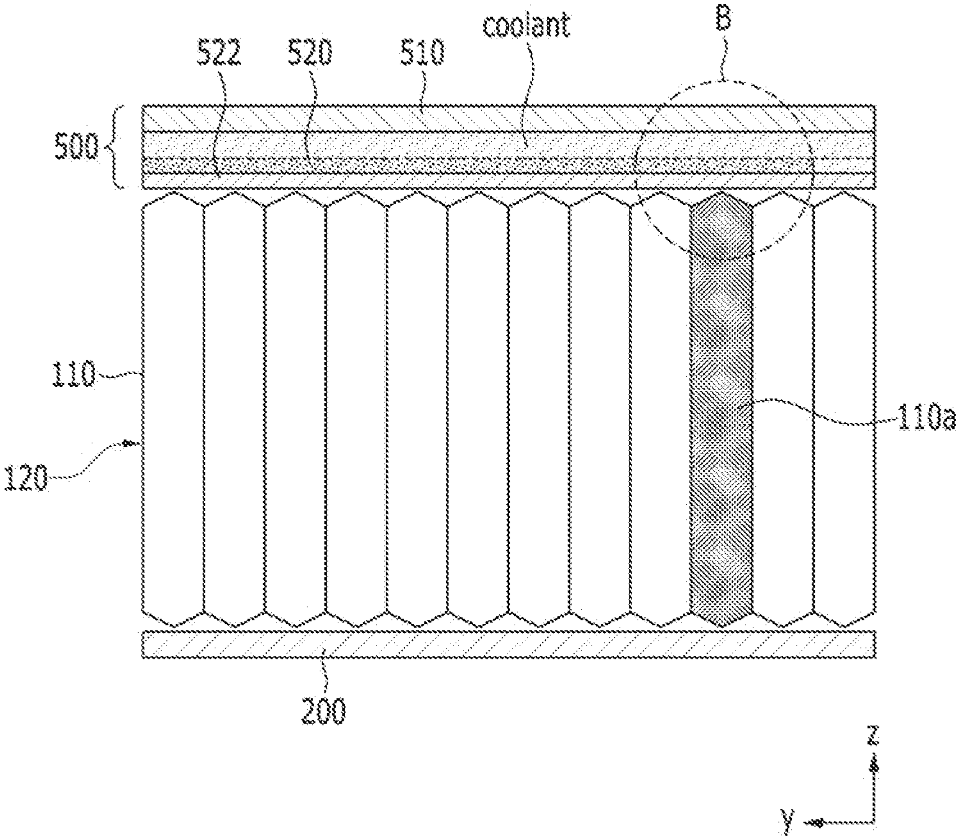

[FIG. 7]
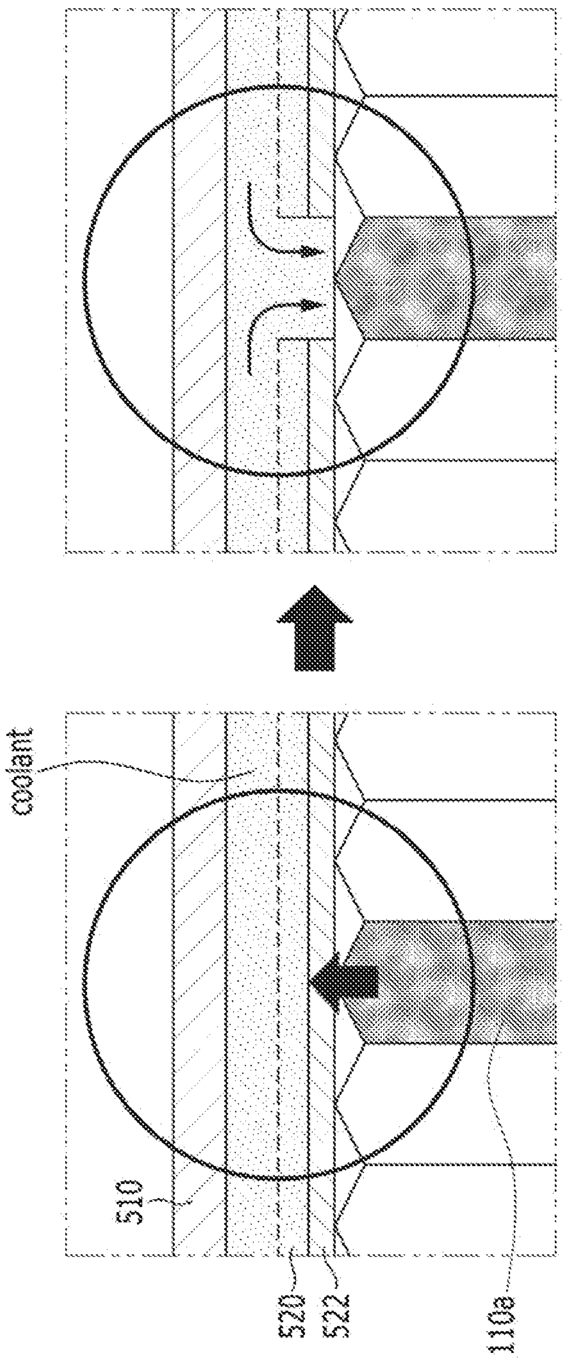

【FIG. 8】
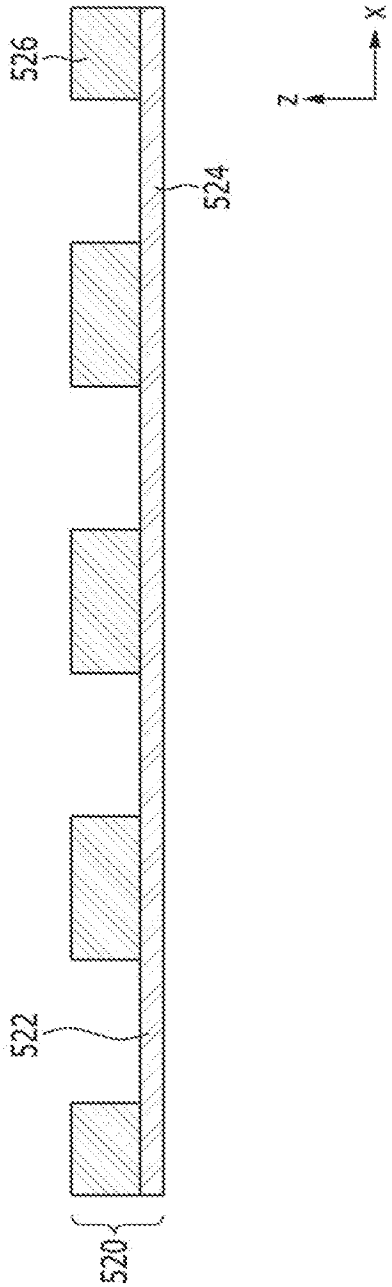

【FIG. 9】
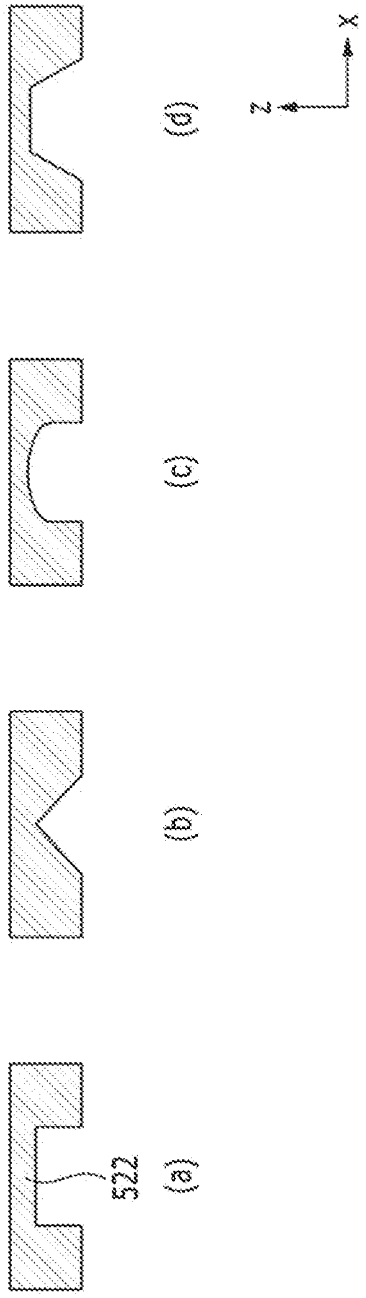

【FIG. 10】
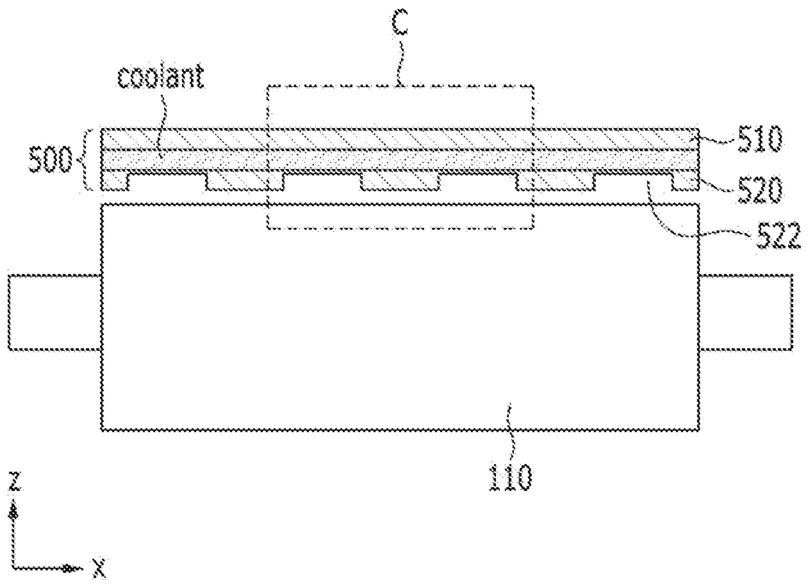

【FIG. 11】
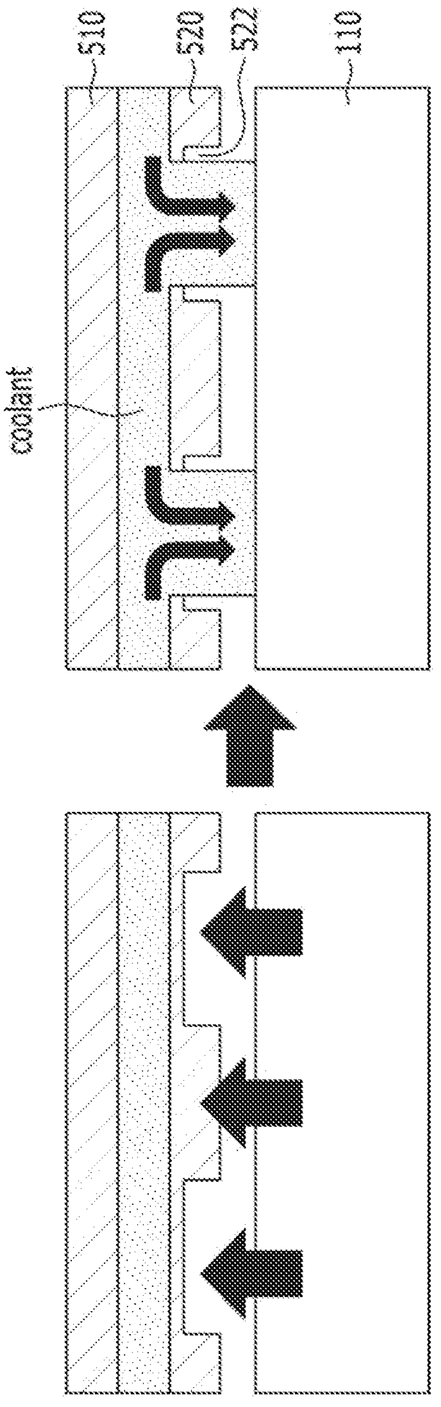

【FIG. 12】
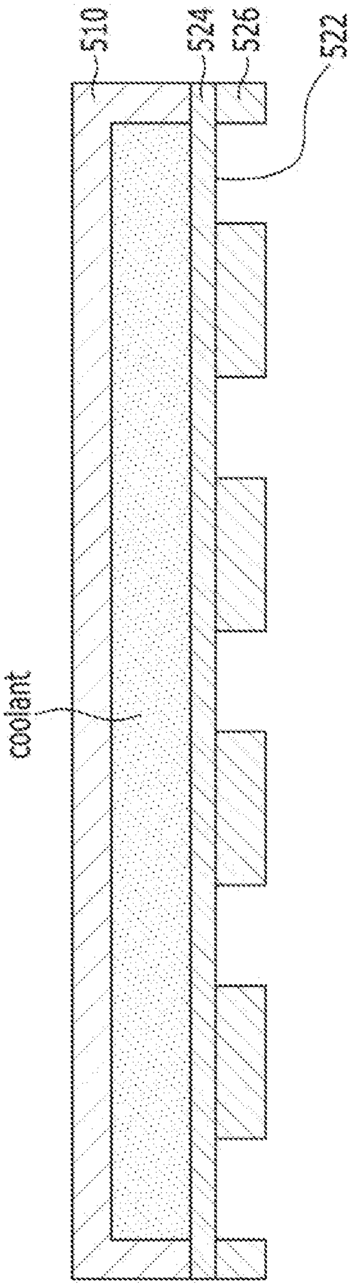

【FIG. 13】
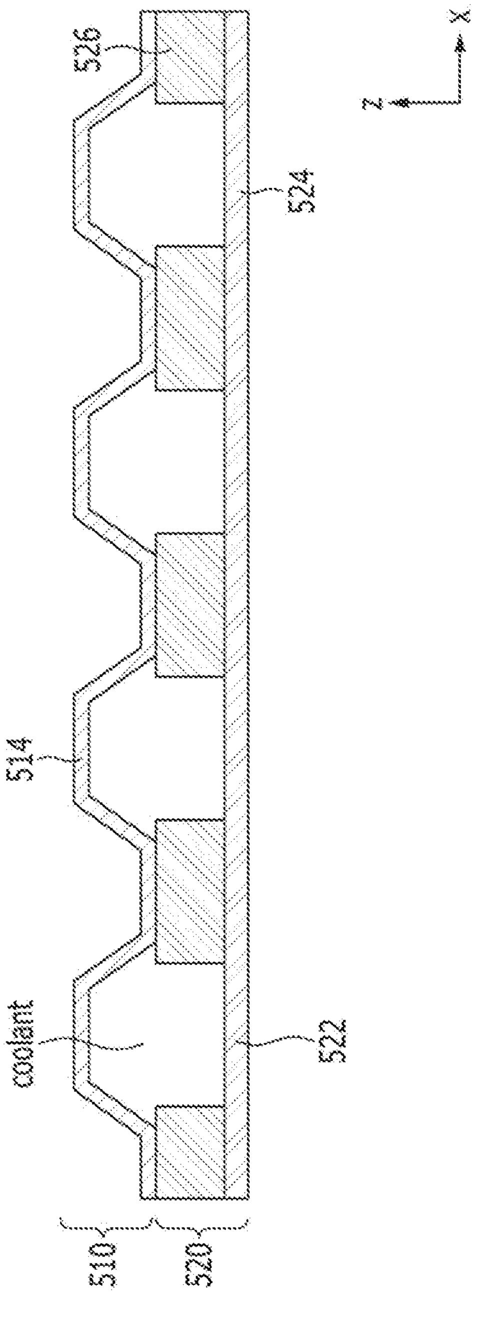

【FIG. 14】
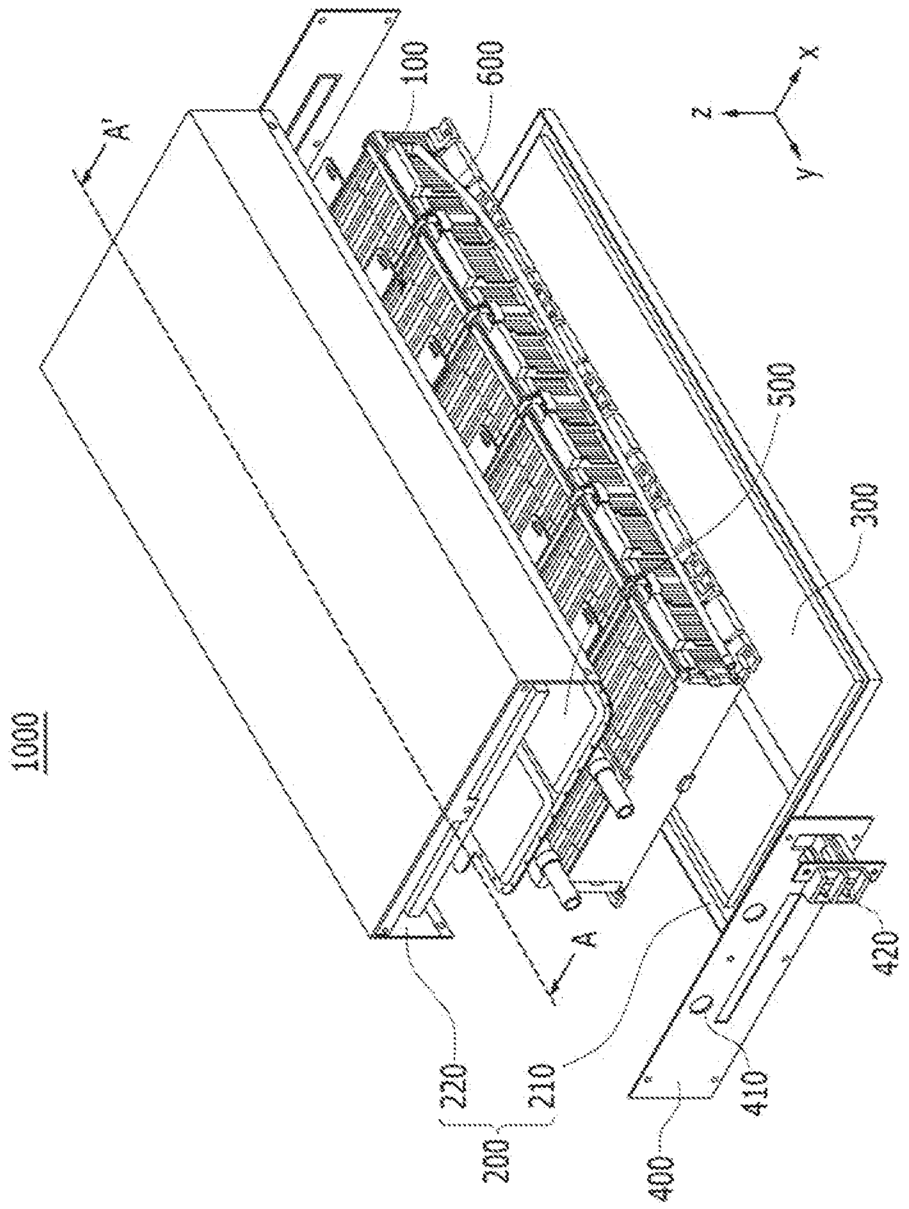

【FIG. 15】
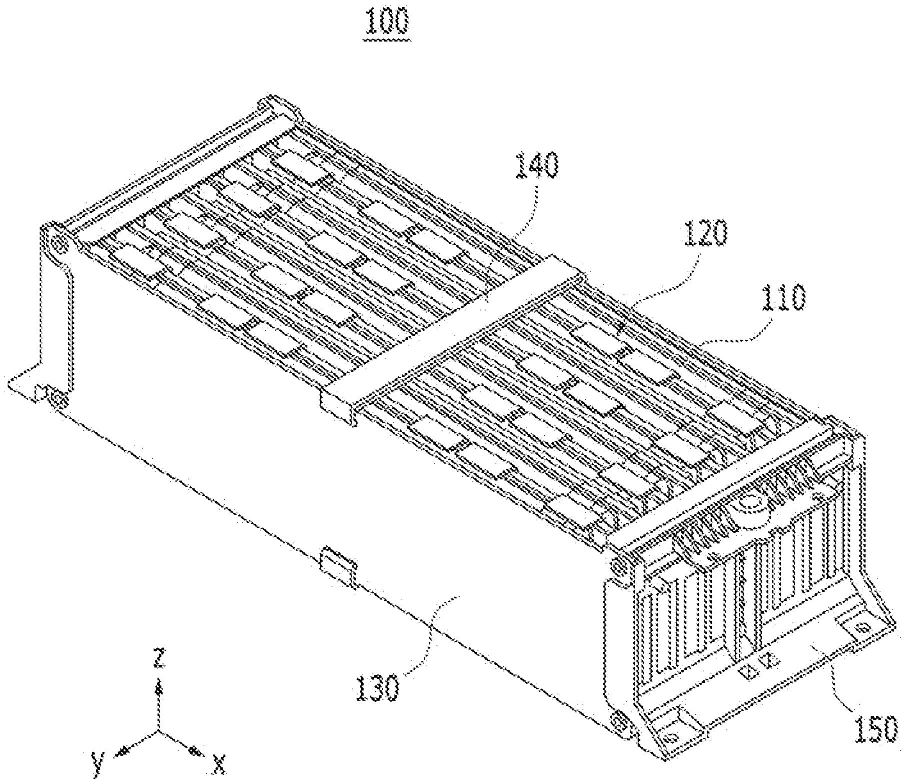

【FIG. 16】
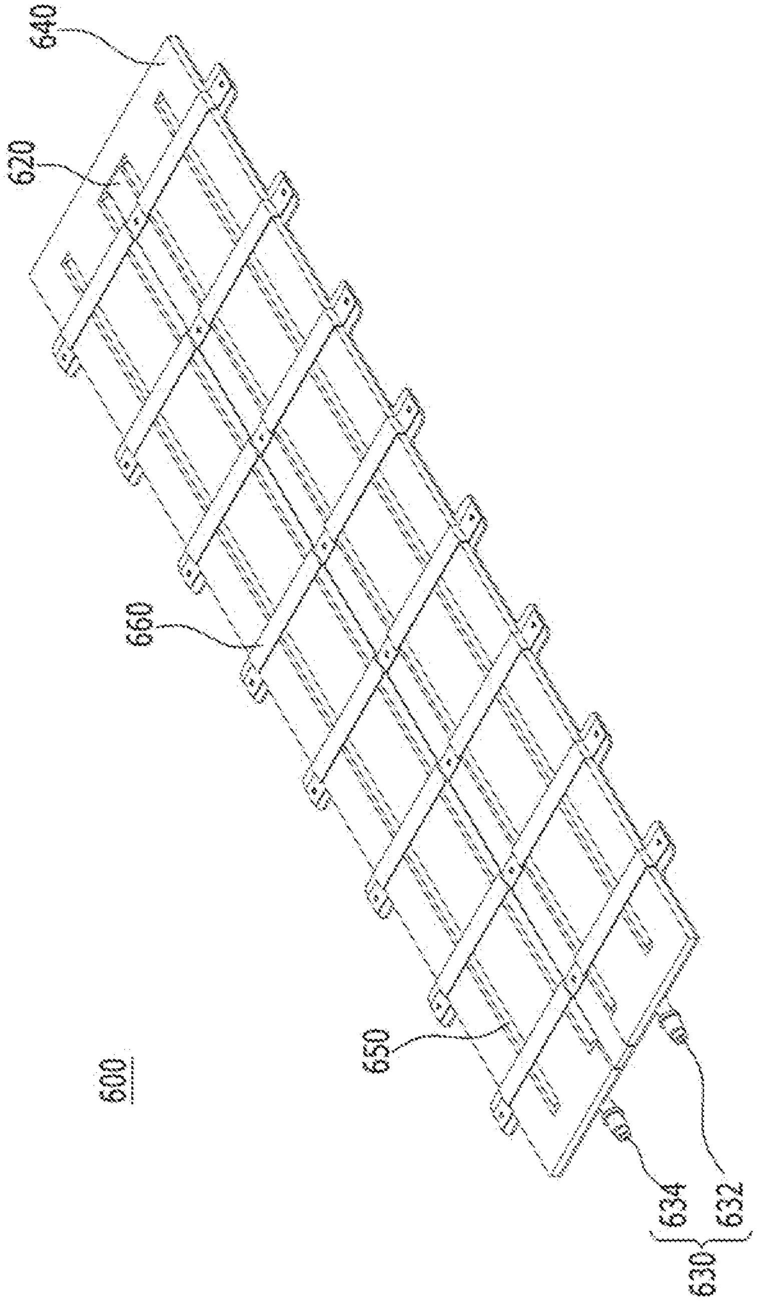

【FIG. 17】
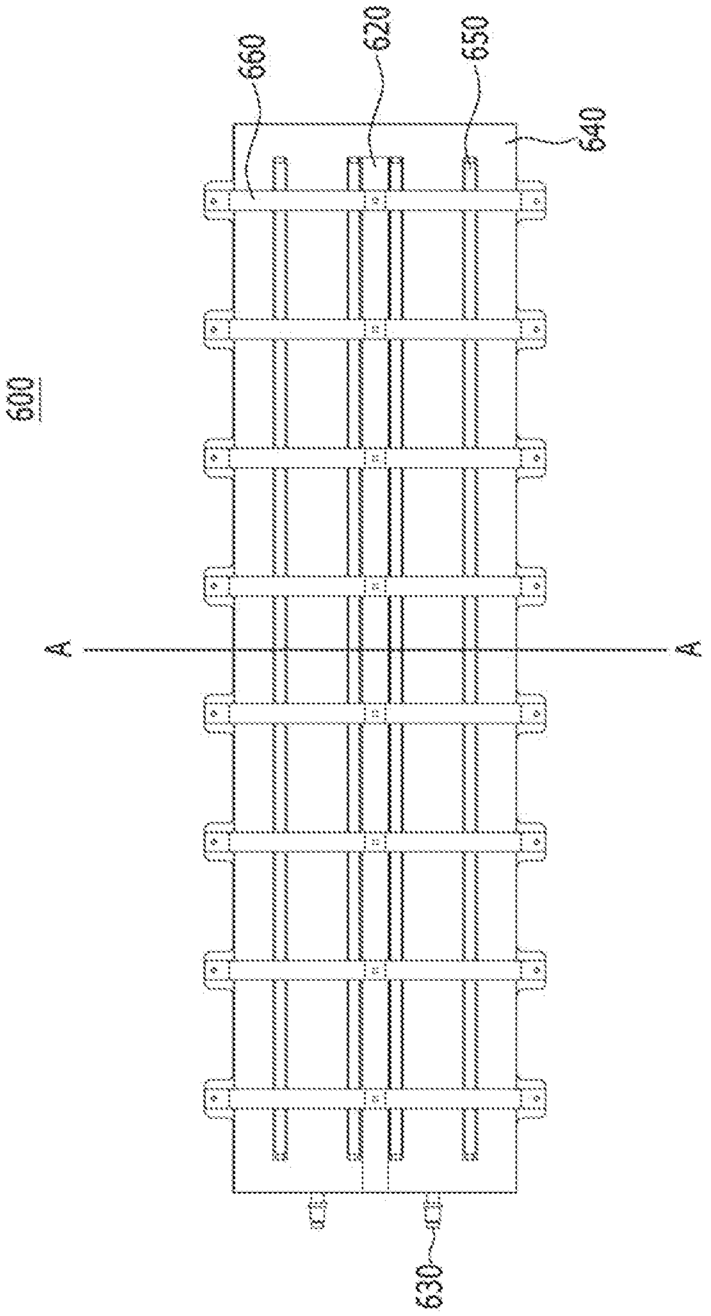

【FIG. 18】
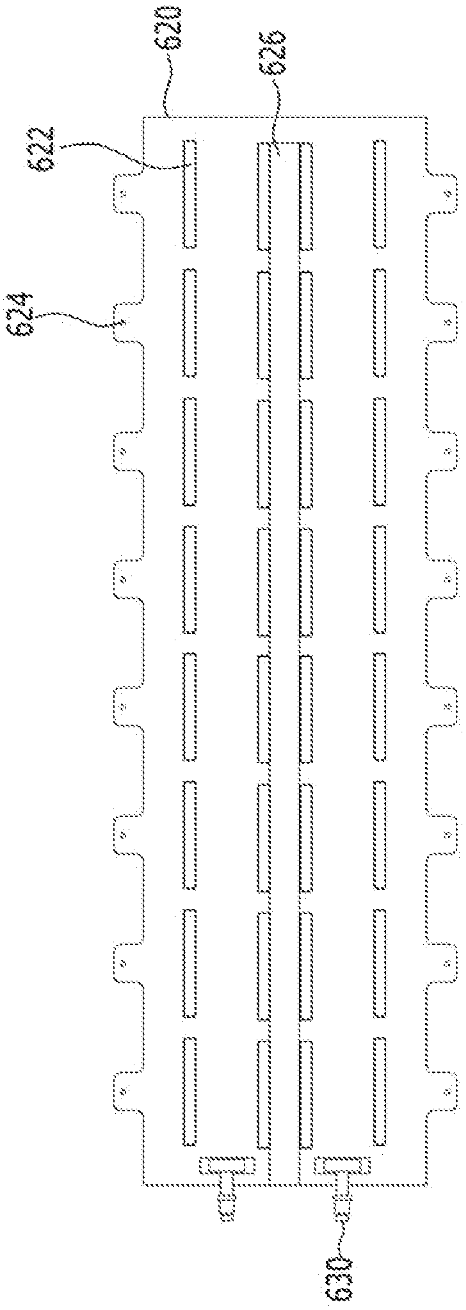

【FIG. 19】
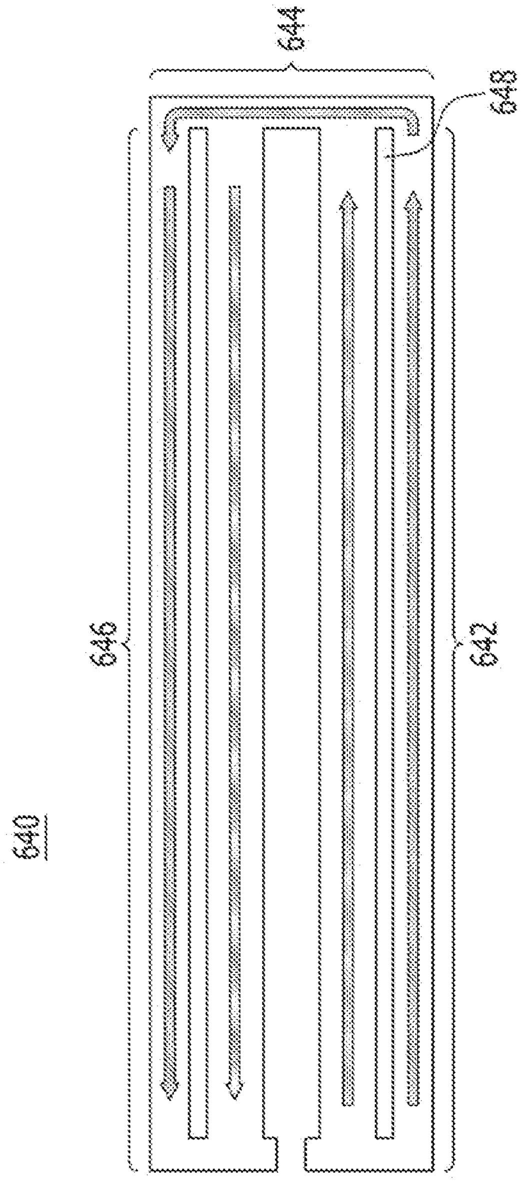

【FIG. 20】
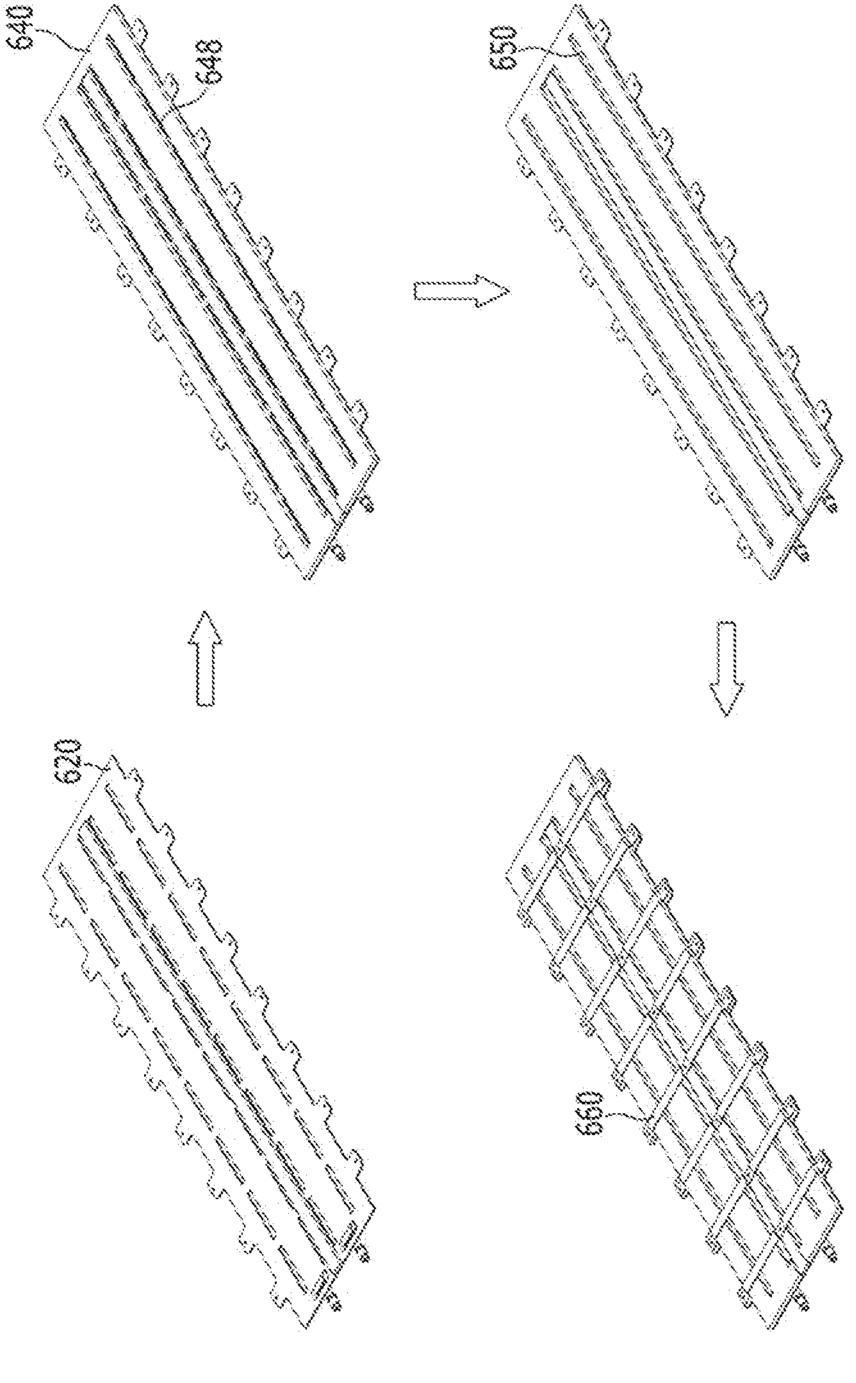

【FIG. 21】
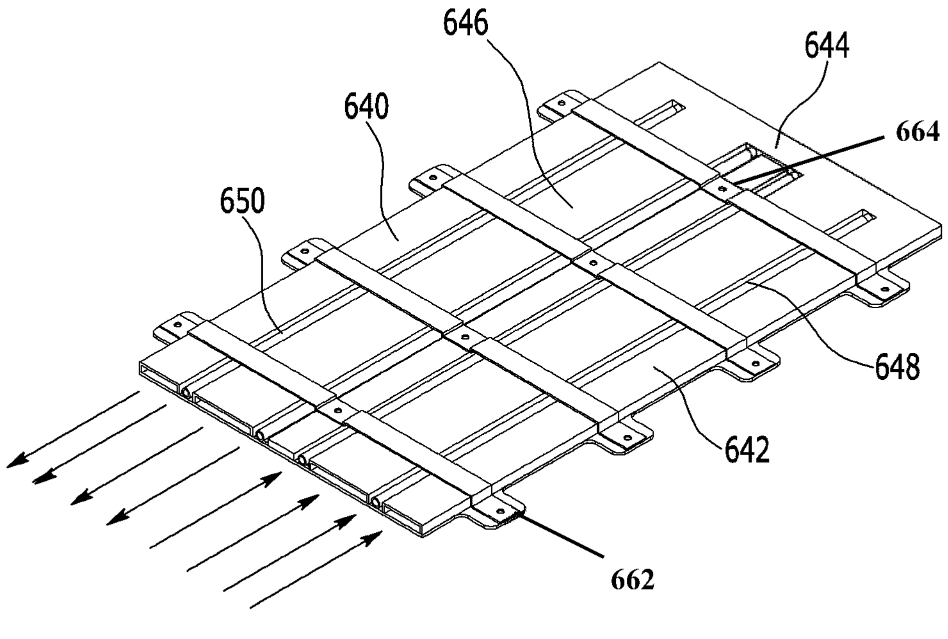

【FIG. 22】
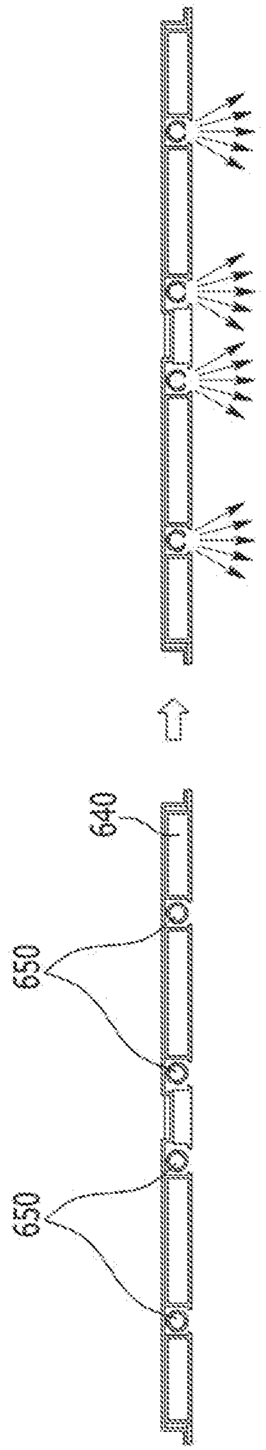

COOLING MEMBER, AND BATTERY MODULE AND BATTERY PACK INCLUDING THE SAME

TECHNICAL FIELD

Cross Citation with Related Application(s)

This application claims the benefit of Korean Patent Application No. 10-2021-0096683 filed on Jul. 22, 2021 and Korean Patent Application No. 10-2021-0165252 filed on Nov. 26, 2021 in the Korean Intellectual Property Office, the contents of which are incorporated herein by reference.

The present disclosure relates to a cooling member, a battery module and a battery pack including the same, and more particularly to a cooling member that prevents a cascading thermal runway, a battery module and a battery pack including the same.

BACKGROUND

In modern society, as portable devices such as a mobile phone, a notebook computer, a camcorder and a digital camera has been daily used, the development of technologies in the fields related to mobile devices as described above has been activated. In addition, chargeable/dischargeable secondary batteries are used as a power source for an electric vehicle (EV), a hybrid electric vehicle (HEV), a plug-in hybrid electric vehicle (P-HEV) and the like, in an attempt to solve air pollution and the like caused by existing gasoline vehicles using fossil fuel. Therefore, there is a growing need for development of the secondary battery.

Currently commercialized secondary batteries include a nickel cadmium battery, a nickel hydrogen battery, a nickel zinc battery, and a lithium secondary battery. Among them, the lithium secondary battery has come into the spotlight because they have advantages, for example, being freely charged and discharged, and having very low self-discharge rate and high energy density.

Meanwhile, in the case of a secondary battery used for small-sized devices, two to three battery cells are used, but in the case of a secondary battery used for a middle- or large-sized device such as an automobile, a middle- or large-sized battery module in which a large number of battery cells are electrically connected is used. Since the middle or large-sized battery module is preferably manufactured so as to have as small a size and weight as possible, a prismatic battery, a pouch-shaped battery or the like, which can be stacked with high integration and has a small weight relative to capacity, is mainly used as a battery cell of the middle or large-sized battery module.

Meanwhile, the battery cell mounted onto the battery module may generate a large amount of heat in the charge and discharge process. If the temperature becomes higher than an appropriate temperature due to overcharging or the like, the performance may deteriorate. If the temperature rise is excessive, there is a risk of explosion or ignition. If an ignition phenomenon occurs inside the battery module, high-temperature heat, gas, or flame may be emitted to the outside of the battery module, wherein the heat, gas, spark or flame emitted from one battery module may be transmitted to other adjacent battery modules at a narrow interval within the battery pack, which can lead to a cascading thermal runaway within the battery pack.

In order to prevent such a thermal runaway, a conventional battery module is equipped with a water injection system that suppresses fires by injecting coolant through nozzles if a fire is confirmed in the battery module. However, injecting coolant or the like from a tank located outside the battery module or battery pack requires multiple processes such as checking whether a fire has occurred, determining whether to inject coolant, and transmitting coolant, which makes it difficult to find the right timing to extinguish the fire.

Therefore, there is a need for a new technology that can quickly suppress the thermal runaway by injecting coolant into the right place at the right time when ignition occurs inside the battery module or battery pack.

DETAILED DESCRIPTION OF THE INVENTION

Technical Problem

It is an object of the present disclosure to provide a cooling member that can inject coolant at the right time and the right place when ignition occurs inside the battery module or battery pack, a battery module and a battery pack including the same.

However, the problem to be solved by the embodiments of the present disclosure is not limited to the above-described problems, and can be variously expanded within the scope of the technical idea included in the present disclosure.

Technical Solution

According to an embodiment of the present disclosure, there is provided a cooling member located in an upper part of a battery cell stack in which a plurality of battery cells are stacked, the cooling member comprising: an upper plate, a lower plate, and a coolant incorporated in an inner space between the upper plate and the lower plate, wherein the lower plate comprises a first part in which a fragile part is formed, and a second part in which the fragile part is not formed, and wherein a thickness of the first part is smaller than a thickness of the second part.

The fragile part has a long side and a short side, and the long side may extend along a stacking direction of the battery cells.

The thickness of the first part may be less than or equal to half the thickness of the second part.

The thickness of the first part may be 0.03 to 0.07 mm.

The fragile part includes a first fragile part and a second fragile part spaced apart from the first fragile part, and a thickness of the first fragile part and a thickness of the second fragile part may be equal.

The lower plate may be formed by joining a first layer having a first thickness and a second layer having a second thickness different than the first thickness, the thickness of the first part may correspond to the first thickness, and the thickness of the second part may correspond to the first thickness and the second thickness.

One of the first layer and the second layer includes a clad metal.

At least one of the upper plate, the first layer, and the second layer includes a clad metal.

The first layer and the second layer may be joined through a brazing process.

The upper plate, the first layer and the second layer may be joined through a brazing process.

The upper plate includes a bent part, a crest of the curved part may overlie the first part, and a trough of the bent part may overlie to the second part.

According to another embodiment of the present disclosure, there is provided a battery module comprising the above-mentioned cooling member.

The upper plate of the cooling member may be integrated with the upper surface of the module frame forming the outer shape of the battery module.

According to another embodiment of the present disclosure, there is provided a cooling member located in an upper part of a battery cell stack in which a plurality of battery cells are stacked, the cooling member comprising: a lower plate where a plurality of openings are formed, a main body that provides a flow path for coolant, and a fixing member that fixes the lower plate and the main body, wherein at least one cooling hose is mounted on the main body, and wherein the cooling hose is melted or fractured above a predetermined temperature or pressure.

The cooling hose may overlie the plurality of openings of the lower plate.

The cooling hose may extend in a longitudinal direction of the cooling member.

The cooling hose may be made of a material having a melting point of 300° C. or less.

The main body may be provided with a housing part for housing the cooling hose.

Opposite ends of the cooling hose may be respectively connected ends of the housing part.

A berm extending in the longitudinal direction of the cooling member is formed at the center of the lower plate, and the main body may be mounted at a position where the berm is not formed on the lower plate.

The fixing member may be a strap, and located in parallel with a width direction of the cooling member.

The fixing member may include end coupling parts that couple with opposite edges of the lower plate, and a central coupling part that couples with a center of the lower plate.

The end coupling parts and the central coupling part may have a step difference from other parts of the fixing member.

The cooling member further includes an inlet port and an outlet port for injecting coolant into and out of the inner space, wherein the inlet port and the outlet port are connected to an external heat exchanger, and wherein the coolant may be circulated through the inlet port and the outlet port.

The main body may have a branched shape into portions, each portion corresponding to one of the inlet port and the outlet port.

According to yet another embodiment of the present disclosure, there is provided a battery pack comprising the above-mentioned cooling member.

The battery pack may include a battery module having an open type structure.

The upper plate of the cooling member may be integrated with an upper surface of a pack frame forming an outer shape of the battery pack.

Advantageous Effects

According to embodiments of the present disclosure, the cooling member partially opens, when ignition occurs inside the battery module or battery pack and injects coolant in the appropriate place, thereby quickly suppressing the internal fire of the battery module or battery pack and preventing continuous thermal runaway.

The effects of the present disclosure are not limited to the effects mentioned above and additional other effects not described above will be clearly understood from the description of the appended claims by those skilled in the art.

BRIEF DESCRIPTION OF THE DRAWINGS

FIG. 1 is a perspective view showing a cooling member according to an embodiment of the present disclosure;

FIG. 2 is a diagram showing an upper plate included in the cooling member of FIG. 1;

FIG. 3 is a diagram showing a lower plate included in the cooling member of FIG. 1;

FIG. 4 is a diagram showing a modification of a lower plate included in the cooling member of FIG. 1;

FIG. 5 is a diagram showing an example of a cross-section A-A of FIG. 3;

FIG. 6 is a diagram showing that an example of a cooling member according to an embodiment of the present disclosure is provided in a battery cell stack;

FIG. 7 is an enlarged view of region B of FIG. 6, which is a diagram for explaining a change in the lower plate when the battery cell ignites;

FIG. 8 is a cross-sectional view showing an example of a cooling member according to an embodiment of the present disclosure;

FIG. 9 is a diagram showing another example of the cross section A-A of FIG. 3;

FIG. 10 is a diagram showing that another example of a cooling member according to an embodiment of the present disclosure is provided in a battery cell stack;

FIG. 11 is an enlarged view of region C of FIG. 10, which is a diagram for explaining a change in the lower plate when the battery cell ignites;

FIG. 12 is a cross-sectional view showing another example of a cooling member according to an embodiment of the present disclosure;

FIG. 13 is a cross-sectional view showing a cooling member according to another embodiment of the present disclosure;

FIG. 14 is an exploded perspective view showing a battery pack according to embodiments of the present disclosure;

FIG. 15 is a perspective view of a battery module included in the battery pack according to FIG. 14;

FIG. 16 is a perspective view showing a cooling member according to another embodiment of the present disclosure;

FIG. 17 is a top view showing the cooling member of FIG. 16;

FIG. 18 is a top view of a lower plate included in the cooling member of FIG. 16;

FIG. 19 is a top view of a body included in the cooling member of FIG. 16;

FIG. 20 is a diagram showing the coupling of the lower plate, the main body, and the cooling hose included in the cooling member of FIG. 16;

FIG. 21 is a diagram showing the cooling member of FIG. 17 cut along the line A-A, showing that coolant flows into and out of the main body and the cooling hose; and FIG. 22 is a cross-sectional view taken along line A-A of the cooling member of FIG. 17, showing injection of coolant through the cooling hose when the battery cell ignites.

DETAILED DESCRIPTION OF THE EMBODIMENTS

Hereinafter, various embodiments of the present disclosure will be described in detail with reference to the accompanying drawings so that those skilled in the art can easily carry out them. The present disclosure may be modified in various different ways, and is not limited to the embodiments set forth herein.

Portions that are irrelevant to the description will be omitted to clearly describe the present disclosure, and like reference numerals designate like elements throughout the description.

Further, in the drawings, the size and thickness of each element are arbitrarily illustrated for convenience of description, and the present disclosure is not necessarily limited to those illustrated in the drawings. In the drawings, the thickness of layers, regions, etc. are exaggerated for clarity. In the drawings, for convenience of description, the thicknesses of some layers and regions are exaggerated.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means arranged on or below a reference portion, and does not necessarily mean being arranged on the upper end of the reference portion toward the opposite direction of gravity. Meanwhile, similar to the case where it is described as being located "on" or "above" another part, the case where it is described as being located "below" or "under" another part will also be understood with reference to the above-mentioned contents.

Further, since the upper surface/lower surface of a specific member can be determined differently depending on which direction is used as a reference direction, the 'upper surface' or 'lower surface' as used herein is defined as meaning two surfaces facing each other on the z-axis of the member.

Further, throughout the description, when a portion is referred to as "including" or "comprising" a certain component, it means that the portion can further include other components, without excluding the other components, unless otherwise stated.

Further, throughout the description, when referred to as "planar", it means when a target portion is viewed from the upper side, and when referred to as "cross-sectional", it means when a target portion is viewed from the side of a cross section cut vertically.

Below, a cooling member according to an embodiment of the present disclosure will be described.

FIG. 1 is a perspective view showing a cooling member according to an embodiment of the present disclosure. FIG. 2 is a diagram showing an upper plate included in the cooling member of FIG. 1. FIG. 3 is a diagram showing a lower plate included in the cooling member of FIG. 1. FIG. 4 is a diagram showing a modification of a lower plate included in the cooling member of FIG. 1. Referring to FIG. 1, the cooling member 500 of the present embodiment can be provided to lower the internal temperature of a battery module or battery pack including a battery cell. The cooling member 500 may be a water-cooled type cooling member 500 into which a refrigerant or coolant is injected. By providing the cooling member 500 in a water-cooled manner, the cooling efficiency of the cooling member 500 can be uniformly maintained, and the battery cells within the battery module or battery pack may be uniformly cooled.

The coolant used in the cooling member 500 can use one of known ones or a mixture thereof, and if the heat of the battery cells can be dissipated by moving along the flow path inside the cooling member 500, and any of known ones can be used. However, as will be described later, since the coolant of the cooling member 500 may be sprayed toward the battery cells, it is desirable that the coolant does not contain combustible materials so as not to amplify flame or explosion of the battery cells. Alternatively, even if some additives of combustible materials must be included to improve the function of the coolant, the amount of the additive can be the degree capable of preventing secondary explosion of the pouch-type battery cell and at the same time, being used as an antifreeze to prevent the coolant from freezing. More specifically, the coolant may include water. Here, the coolant may contain, in addition to water, an antifreeze liquid for lowering the freezing point of water. In addition, as the antifreeze liquid contained in the coolant, an electrically insulating antifreeze having electrical insulating properties can be used.

The cooling member 500 may be arranged on one surface of the battery cell stack to dissipate the heat of the battery cells. The cooling member 500 can be arranged in parallel with the stacking direction of the battery cell stack so as to be located close to the plurality of battery cells of the battery cell stack. Specifically, the cooling member 500 may be located on the upper part of the battery cell stack (in the +z-axis direction of FIG. 14).

The size of the cooling member 500 may be matched with the size of the battery cell stack to which the cooling member 500 is applied. In one example, the cooling member 500 may be provided so as to correspond to one battery cell stack, wherein the length of the cooling member 500 may be matched with the length of the battery cell stack, or may be formed larger or smaller with a slight margin, and the width of the cooling member 500 may be matched with the width of the battery cell stack, or may be formed larger or smaller with a slight margin. In another example, the cooling member 500 may be provided so as to correspond to a plurality of battery cell stacks, wherein the length and width of the cooling member 500 may match with the length and width of the plurality of battery cell stacks, or may be formed larger or smaller with a slight margin. Here, the cooling member 500 may be located inside the battery module, but it can also be located at the inside of the battery pack 1000 (see FIG. 14) from the outside of the battery module.

The cooling member 500 may include an upper plate 510 and a lower plate 520 that form the outer shape of the cooling member 500, and an inlet/outlet port 530 that injects coolant into the inside of the cooling member 500.

The cooling member 500 may be formed by coupling the edges of the upper plate 510 and the lower plate 520. A sealing part 540, that is formed by coupling the edges of the upper plate 510 and the lower plate 520, may be located at an edge part of the cooling member 500. The coolant can be contained or circulated between the upper plate 510 and the lower plate 520 coupled in the cooling member 500.

The coolant may be supplied through an inlet port 530 disposed side by side and discharged to the outlet port 530. The inlet port 530 and the outlet port 530 may be disposed side by side in parallel on one end side of the cooling member 500. This may be for simplifying the design regarding the inflow and discharge of the coolant supplied from the outside of the battery module or battery pack. Further, this can be for minimizing the temperature difference between the periphery of the inlet port 530 and the periphery of the outlet port 530. Specifically, the coolant flowing into the inlet port 530 may have the lowest temperature, and the coolant discharging to the outlet port 530 may have the highest temperature. Therefore, when the inlet/outlet ports 530 are arranged adjacent to each other, mutual heat exchange occurs, so that a temperature deviation of the entire coolant flowing through the inner space of the cooling member can be minimized. Therefore, by arranging the inlet/outlet ports 530 side by side, the cooling member 500 can have uniform heat dissipation performance as a whole. Further, the inlet port 530 or the outlet port 530 may be made of aluminum. The inlet port 530 or the outlet port 530 may be joined to the upper plate 510 or the lower plate 520 through welding such as brazing.

A flow path forming groove 550 may be formed in the cooling member 500. As the flow path forming groove 550 is provided in the cooling member 500, the flow of the coolant provided to the cooling member 500 can be determined. The flow path forming groove 550 can be formed in plural numbers, and the plurality of flow path forming grooves 550 may be disposed along a straight line parallel to the longitudinal direction of the cooling member 500. The flow path forming groove 550 may be formed consecutively along the longitudinal direction of the cooling member 500 at the center of the cooling member 500 except for a predetermined section, whereby the flow of the coolant can be formed in a U-shape. The flow of the coolant injected through the inlet port 530 of the cooling member 500 can be restricted by the flow path forming groove 550. As the coolant flows along the U-shape, the coolant injected through the inlet port 530 may be discharged to the outlet port 530 located side by side with the inlet port 530. Specifically, the U-shaped flow path through which the coolant flows may include a first flow path extending from the inlet port 530 along a straight line parallel to the longitudinal direction of the cooling member 500, a second flow path extending along a curve rotating in a clockwise or counterclockwise direction at the terminal end of the first flow path, and a third flow path extending along a straight line parallel to the longitudinal direction of the cooling member 500 toward the outlet port 530 at the terminal end of the second flow path.

A deformation prevention groove 560 may be formed in the cooling member 500. As the deformation prevention groove 560 is provided in the cooling member 500, the shape deformation of the cooling member 500 by the coolant can be prevented. For example, when coolant is injected into the cooling member 500, the injected coolant may be concentrated in the ½ space of the cooling member 500 by the flow path forming groove 550 that crosses the center. Until the coolant moves through the U-shaped flow path into the remaining ½ space, a large pressure can be applied to the space, whereby at least a part of the cooling member 500 may expand or the cooling member 500 may be damaged. When the deformation prevention groove 560 is formed in the flow path of the cooling member 500, the coolant is temporarily concentrated and thus, even if a large pressure acts on a specific section, deformation due to this can be minimized. The deformation prevention grooves 560 may be partially disposed at intervals in the U-shaped flow path through which the coolant flows in the cooling member 500. The deformation prevention groove 560 may be disposed between the flow path forming groove 550 and the sealing part 540 in the width direction of the cooling member 500. The specific position of the deformation prevention groove 560 may be appropriately set so as to correspond to the flow rate and flow velocity of the coolant without excessively obstructing the coolant flowing in through the inlet port 530. Here, the width direction of the cooling member 500 may be a direction parallel to a short side of the cooling member 500. Further, here, the longitudinal direction of the cooling member 500 may be a direction parallel to a long side of the cooling member 500.

In addition, a protrusion part extending from one side of the cooling member 500 and disposed consecutively along the longitudinal direction of the cooling member 500 can be formed in the periphery of the cooling member 500. As shown in FIG. 14 described later, the protrusion part may be disposed in contact with, or adjacent to, an electrode lead of each battery cell stack or a busbar connected to the electrode lead. The electrode lead or busbar that provides electrical connection in the battery module or battery pack is a configuration that is prone to heat generation. Therefore, when the above-mentioned protrusion part promotes heat dissipation of the electrode lead or the busbar, the temperature rise of the battery cell can be more effectively prevented.

Referring to FIG. 2, the upper plate 510 is provided in a plate shape. The central part of the upper plate 510 is recessed or indented to have a step difference from the edge part. The upper plate 510 may have a recessed shape with respect to a cross section in the width direction. This can be for forming an inner space through a step difference so that the upper plate 510 accommodates the coolant. Here, the width direction of the upper plate 510 may be a direction parallel to the short side of the upper plate 510. However, the upper plate 510 may be formed in a different manner than that shown in FIG. 2, and when the lower plate 520 includes the fragile part 522 and the like to provide a space for containing coolant, the upper plate 510 can also be provided to have an overall flat shape.

Referring to FIG. 3, the lower plate 520 of the cooling member 500 may have a shape similar to the upper plate 510 as a whole. The lower plate 520 may also be provided in a plate shape. The lower plate 520 may be formed so that the central part thereof is recessed or indented to have a step difference from the edge part. The lower plate 520 may have a recessed shape on the basis of a cross section in the width direction, thereby forming an inner space for housing the coolant. However, the lower plate 520 does not necessarily have to be provided in a recessed shape, and may be provided in an overall flat shape depending on the shape of the upper plate 510 or the volume of coolant to be contained. Here, the width direction of the lower plate 520 may be a direction parallel to the short side of the lower plate 520.

Further, the lower plate 520 may have a fragile part 522 described later, so that one surface of the lower plate 520 may have a partially recessed groove. When the groove is located toward the inside of the cooling member 500, that is, when it is formed on the upper surface of the lower plate 520, the coolant may be contained in the groove.

When the cooling member 500 is provided on the upper part of the battery cell, the lower plate 520 may be a portion located closest to the battery cell in the cooling member 500. Therefore, the lower plate 520 may be preferably made from a material having high thermal conductivity so as to promote heat dissipation of the battery cell. Further, in order to improve the overall heat dissipation performance of the cooling member 500, the upper plate 510 of the cooling member 500 may also be made from a material having high thermal conductivity. The upper plate 510 and the lower plate 520 for forming the outer shape of the cooling member 500 may be made of a metal with high stiffness, and specific examples thereof include aluminum, gold, silver, copper, platinum, an alloy containing these, or the like.

Meanwhile, as described above, when ignition occurs in a battery cell, it may be effective to inject a liquid such as coolant into the battery module or battery pack in order to effectively suppress it. Having a liquid tank inside the battery module or battery pack may have the problem of increasing the volume of the battery module and battery pack. Therefore, conventionally, a separate water tank is provided outside the battery module and the battery pack, and coolant or the like is injected into the battery module or battery pack through a nozzle or the like extending from the water tank only when ignition of the battery cell was confirmed through the sensor.

However, the water tank provided outside the battery module and the battery pack has the problem that its volume is large and also the user has to manage it separately. Further, the conventional water injection system must be equipped with a separate control unit or communication unit for determining whether to inject coolant, must not cause an error in their operation, and must go through a number of determination processes even if it operates normally, which takes a lot of time. Even after deciding to inject coolant, if the path from the water tank to the battery cell inside the battery module or battery pack is slightly long, it is difficult to quickly provide coolant from the water tank to the battery cells, and thus, the conventional water injection system is difficult to suppress the continuous thermal runaway phenomenon which proceeds rapidly.

Therefore, in the following, by having a part fragile to heat or temperature, the lower plate 520 of the cooling member 500 of the present embodiment that can be partially opened when the battery cell ignites will be described in more detail.

Referring to FIGS. 3 and 4, the lower plate 520 of the present embodiment may include a fragile part 522. The 'fragile part' may refer to a portion that is more easily fractured by heat or pressure than other parts of the lower plate 520. The fragile part 522 may be a portion having a relatively smaller thickness value than other portions of the lower plate 520. Specifically, the lower plate 520 may have a first part referred to as a fragile part 522 and a second part in which the fragile part 522 is not formed, wherein the thickness of the second part may be larger than the thickness of the first part. The thickness value of the first part may be less than or equal to half the thickness value of the second part. The fragile part 522 has a slightly smaller thickness value than other portions, so that it can be pierced relatively easily by heat or pressure.

The fragile part 522 may be formed to extend along the stacking direction of the battery cells. The longitudinal direction (y-axis) of the fragile part 522 may be a direction in which the length (long side) extends, and may be a direction parallel to the stacking direction of the battery cells 110. The width direction (x-axis) of the fragile part 522 may be a direction perpendicular to the stacking direction of the battery cells 110. Since it is impossible to predict whether or not a battery cell 110 among the battery cells will cause ignition, the fragile part 522 may be formed to correspond to all battery cells located under the cooling member 500. The fragile part 522 may be formed on the entire length section of the cooling member 500. Here, the fragile part 522 may be provided on a straight line parallel to the stacking direction of the battery cells as shown in FIG. 3, and two or more may be provided along a straight line parallel to the stacking direction of the battery cells as shown in FIG. 4.

The fragile parts 522 may be located consecutively in the width direction (x-axis). Here, the width of the fragile part 522 may be designed differently according to the intention of the designer. For example, the fragile part 522 may have a wide width. In another example, the fragile part 522 may have a relatively narrow width. The narrow fragile part 522 may be formed continuously.

The fragile part 522 may be located to correspond to a portion that is most likely to generate heat among the battery cells. For example, the electrode lead of the battery cell may be a portion that is easily heated because the movement of electrons is concentrated. In order to cope with heat generation or explosion of the electrode lead, the fragile part 522 may be arranged on the electrode lead of the battery cell.

FIG. 5 is a diagram showing an example of a cross-section A-A of FIG. 3.

Referring to FIG. 5, the cross-section of the fragile part 522 may have various shapes. Here, the cross section of the fragile part 522 may be obtained by cutting the cooling member 500 with reference to the xz plane as shown in FIG. 3.

The fragile part 522 is a portion having a different thickness in the lower plate 520, and a part of the lower plate 520 may have a square cross sectional shape as shown in FIG. 5(*a*) by vertically connecting the first part in which the fragile part 522 is not formed and the second part in which the fragile part 522 is formed. Further, when an inclination is formed on the connection surface between the first part and the second part, a part of the lower plate 520 may have a triangular cross sectional shape as shown in FIG. 5(*b*) or a trapezoidal cross-sectional shape as shown in FIG. 5(*d*). When the connection surface between the first part and the second part is formed to have a curvature, a part of the lower plate 520 may have a round-shaped cross section as shown in FIG. 5(*c*). Meanwhile, the cross sectional shape of the lower plate 520 according to the formation of the fragile part 522 is not limited by the above-described examples, and thus can be variously modified in consideration of the ease of design and the like. Considering that the fragile part 522 must be fractured by heat or temperature, since it may be desirable for the fragile part 522 to include as many thin portions as possible, there are cases where other shapes of FIG. 5 is more desirable than the shape of FIG. 5(*b*). However, the temperature and pressure to fracture may be affected by factors such as thickness, physical properties, shape, etc. and thus, the shape of FIG. 5(*b*) may not be necessarily preferable to the other shapes of FIG. 5.

FIG. 6 is a diagram showing that an example of a cooling member according to an embodiment of the present disclosure is provided in a battery cell stack. FIG. 7 is an enlarged view of region B of FIG. 6, which is a diagram for explaining a change in the lower plate when the battery cell ignites. FIG. 8 is a cross-sectional view showing an example of a cooling member according to an embodiment of the present disclosure. Meanwhile, in FIG. 8, it is clarified in advance that the upper plate 510 is omitted.

Referring to FIGS. 6 and 7, the battery cell stack 120 in which the battery cells 110 are stacked in one direction is housed in the module frame or the pack frame, and the cooling member 500 may be arranged on the battery cell stack 120.

The cooling member 500 includes an upper plate 510 and a lower plate 520, and coolant may be housed in a space between the upper plate 510 and the lower plate 520. The lower plate 520 of the cooling member 500 is located toward the battery cell stack 120, and the fragile part 522 formed on the lower plate 520 may be formed long along the stacking direction of the battery cells 110 so as to correspond to the battery cells 110 of the battery cell stack 120. FIGS. 6 and 7 show a cross section of a position where the fragile part 522 is formed, and the upper surface of the lower plate 520 on which the fragile part 522 is not formed may be hidden by the coolant. Therefore, the upper surface of the second part of the lower plate 520 is indicated by dashed lines in FIGS. 6 and 7.

When a fire occurs in the first battery cell 110*a* due to overcharging or the like, the first part of the fragile part 522 located above the first battery cell 110*a* may be fractured by heat, gas, sparks, flames, etc. generated from the first battery cell 110*a*. By opening the first part, the coolant housed in the inner space of the cooling member 500 may be injected toward the first battery cell 110*a* in which the fire has occurred. In this way, when the thermal runaway occurs in the first battery cell 110*a*, the fragile part 522 is partly opened so that the coolant is immediately supplied to the first battery cell 110*a*. Therefore, the fire of the first battery cell 110*a* can be quickly suppressed, and the thermal runaway can be quickly suppressed as compared to conventional water injection systems.

At this time, as shown on the right side of FIG. 7, heat or pressure generated from the battery cell 110 locally heats or pressurizes the fragile part 522, thereby opening the first part. Therefore, in the fragile part 522, only the first part is opened, and other parts of the fragile part 522 may be maintained in a closed state. If parts other than the first part in the fragile part 522 are maintained in a closed state, the coolant inside the cooling member 500 can concentrate and flow out to the first part. Therefore, coolant can be injected into the first battery cell 110*a* in a concentrated manner as compared with the conventional water injection system, thereby maximizing the efficiency of the extinguishment due to the water injection.

Meanwhile, if an excessive amount of coolant is injected into the battery module or battery pack, fire suppression in the first battery cell 110*a* can be quickly achieved, but the coolant is injected into the other battery cells 110, so that the plurality of normally operating battery cells 110 may be damaged. Therefore, the amount of injected coolant needs to be designed in advance to an appropriate level.

The amount of coolant can be preset to a level sufficient to suppress fires that have occurred in some battery cells 110. Here, the number of battery cells 110, which is the basis for calculating the amount of coolant, may be the number of battery cells 110 to which thermal runaway is typically transmitted during internal ignition, and specifically, it may be four to six, or one to two smaller or larger than four to six. Further, since the coolant sprayed toward the first battery cell 110*a* is vaporized and evaporated into water vapor during the fire suppression process, the coolant may not remain in the battery module or battery pack, and damage to the normal battery cell 110 can be prevented by residual moisture. Meanwhile, since the amount of coolant housed in the cooling member 500 can be calculated in advance and designed to match with the energy released by the battery cell 110, the cooling member 500 of the present embodiment can be applied in various ways without being restricted by the type or capacity of the battery cell 110 such as a cylindrical, prismatic, or pouch type.

At this time, the coolant of the cooling member 500 may or may not flow in and circulate from the outside. In a specific example, the cooling member 500 may be connected with an external tank, and the coolant flowing in from the tank circulates in the cooling member 500 through the inlet/outlet port 530 and may be discharged back to the tank. Thereby, since the temperature of the coolant may be properly maintained, the heat dissipation performance of the cooling member 500 can be improved.

In another specific example, the coolant inside the cooling member 500 may not be further flowed in. The coolant is injected before the cooling member 500 is mounted on the battery module or battery pack, and additional injection and discharge may not be performed when using the battery module or battery pack. When the cooling member 500 is not continuously connected to the external tank, and is incorporated in the battery pack or battery module, the external tank is omitted and thus, the overall structure can be simplified, which is efficient in space utilization. Further, the cost and time required to maintain/manage the external tank can be reduced. Further, in such a case, the inlet/outlet port 530 can be excluded from the cooling member 500 to simplify the design. Since the cooling member 500 contains water having a large specific heat, heat transfer between the battery cells 110 in the battery module can be effectively prevented even without circulation. Further, if an internal ignition occurs in the battery module or battery pack, only a predetermined amount of coolant can be ejected to the battery cell 110, and thus, a problem caused by the coolant remaining in the battery module or battery pack can be minimized.

When the coolant of the cooling member 500 does not flow into the external tank in this way, the amount of coolant that is injected into the battery module or battery pack during the internal ignition of the first battery cell 110*a* can be limited to the entire coolant contained in the cooling member 500. Further, when the cooling member 500 is provided with a partition wall or a groove therein and thus, the movement of the coolant inside the cooling member 500 is restricted, the amount of coolant injected into the first battery cell 110*a* may be limited to the amount of coolant housed between the fragile part 522 and the upper plate 510.

This also may be applied even if the cooling member 500 has a system connected to an external tank. Specifically, the control system including the cooling member 500 may detect a thermal transition or thermal runaway, and when the thermal runaway is detected, the amount of coolant supplied to the first battery cell 110*a* can be limited within the volume range of the cooling member 500 by controlling the inflow or circulation of additional coolant.

As described above, the fragile part 522 according to the present embodiment injects coolant into the proper place at the right time during internal ignition of the battery pack or battery module, thereby capable of quickly suppressing fire and preventing continuous thermal runaway phenomenon.

The fragile part 522 of the present embodiment can be formed in various ways.

For example, the fragile part 522 may be formed by partially etching the lower plate 520. The fragile part 522 may be formed using a notching process. However, the equipment used in the etching process may be difficult to control to a precise level, and when the thickness of the lower plate 520 is thin, or when the thickness of the desired fragile part 522 is thin, the dimensional stability of the fragile part 522 may be greatly reduced. For example, when the lower plate 520 is formed of aluminum, the lower plate 520 may have a thin thickness of 4 mm, 3 mm, or 2 mm or less. The appropriate thickness of the fragile part 522 may vary depending on the material of the fragile part 522, but when the lower plate 520 is formed of aluminum, the fragile part 522 may be preferably formed to a thickness of 0.2 to 0.5 mm. In order for the fragile part 522 to be provided on the lower plate 520, the fragile part 522 needs to have the thickness of the thin film level by removing a part of the lower plate 520 that is already thin enough. When the control of the device is not complete, the lower plate 520 may be damaged in the process of forming the fragile part 522, whereby process costs and process time due to an increase in defective products may be wasted. Therefore, when the lower plate 520 has the fragile part 522 as in the present embodiment, the application of the etching process may not be desirable.

In order to form the fragile part 522 to have a sufficiently thin thickness, the lower plate 520 may be formed by joining two layers. As shown in FIG. 8, the lower plate 520 may be formed by joining a first layer 524 provided as a plate-shaped member and a second layer 526 having a plurality of holes. For reference, the portion indicated by diagonal lines in FIG. 8 represents the second layer 526, and the partially empty space between the diagonal lines represents a cross section of the hole formed in the second layer 526. The hole formed in the second layer 526 may be a portion for forming the above-mentioned fragile part 522. The hole may have an elongated shape. One or more holes may be formed along a straight line parallel to the long side of the lower plate 520. When a plurality of holes are provided along a straight line parallel to the long side of the lower plate 520, the holes may not have an elongated shape depending on the number and spacing thereof. Further, the axial cross section of the hole may have various shapes as shown in FIG. 5. The radial cross section of the hole may have an angled shape or may have a round shape.

A part of the lower plate 520 has a relatively thick thickness by including the first layer and the second layer, and another part of the lower plate 520 may have a relatively thin thickness by including only the first layer 524. Here, the portion having the first layer 524 may be referred to as a first part, and the portion having both the first layer 524 and the second layer 526 may be referred to as a second part. Therefore, the thickness of the first part may correspond to the thickness of the first layer 524, and the thickness of the second part may correspond to the total thicknesses of the first layer 524 and the second layer 526.

When the lower plate 520 is formed by joining two layers, the thickness of each layer can be freely adjusted, so that the fragile part 522 can be formed to be sufficiently thin. For example, if both the first layer 524 and the second layer 526 are provided of aluminum, the first layer 524 is provided as an aluminum plate having a thickness of 0.03 to 0.07 mm, or 0.04 to 0.06 mm, or 0.05 mm, and the second layer 526 may be provided in a state in which a hole is formed in an aluminum plate having a thickness of 1.0 to 1.5 mm, or more. Here, in the case of a design requiring mechanical rigidity, the thickness of the first layer 524 may be designed to be sufficiently thick to a level that can be melted by thermal runaway of the battery cell. Therefore, it would be possible for the first layer 524 to be provided to have a value slightly larger than the thickness value described above. When the aluminum plate of the second layer 526 is respectively joined to one surface of the first layer 524, a lower plate 520 having a fragile part 522 of a sufficiently thin thickness can be formed.

Here, when the lower plate 520 is formed by joining the two layers, all the fragile parts 522 are formed as one plate, and thus, the thickness values may be equal to each other. When the first fragile part and the second fragile part are formed on the lower plate 520, the thickness of the first fragile part and the second fragile part may be substantially equal to each other. Further, here, the thickness value of each fragile part 522 may not appear deviation depending on the position. When the thickness deviation according to the position occurs in the fragile part 522, a part of them may be formed thicker than designed, whereby a specific part may be difficult to fracture due to heat or pressure. However, since the fragile parts 522 of the present embodiment are all formed to have a uniform thickness, the error between the design and the actual product can be minimized.

Various types of joining processes may be applied to joining the two layers forming the lower plate 520. Since the coolant is located on the upper surface of the lower plate 520, the coupling of the two layers needs to be firmly formed.

For example, the coupling of the two layers may be formed through a welding process. Examples of the welding process used for the coupling may include brazing or laser welding. By applying a temperature similar to the melting point of the material to the two layers, the two layers may be melt-joined. Through the melt joining, the watertightness of the lower plate 520 may be achieved at a desired level.

In another example, the coupling of the two layers may be formed through a rolling process. The rolling process is a method of joining two layers by passing a laminate in which two or more layers are laminated between a pair of rolls. The laminate may be heated during interlayer joining by the rolling process, wherein if the heated temperature is higher than the recrystallization temperature of the metal, it is referred to as hot roll, and if it is below the above temperature, it may be referred to as cold roll. By applying pressure and/or heat to the laminate, a wide joining surface between the two layers can be formed, and thus, the watertightness of the lower plate 520 can be sufficiently secured.

Meanwhile, when the lower plate 520 is formed through the coupling of two layers, the materials of the two layers may be different, and may be of the same or similar material to each other. If the materials of the two layers are the same or similar to each other, the melting points of the two layers are the same/similar, and thus the above-described joining process involving heat or pressure can be more easily performed.

Meanwhile, when two layers are joined through a brazing process, the joining process may not be smoothly performed depending on the physical properties or melting point of the metal. For example, if the two layers are formed of a single property of aluminum, setting the temperature of the brazing process at the level of 660° C., which is the melting point of aluminum, can cause shape deformation of the aluminum layer during the joining process. In order to prevent such layer deformation, the first layer 524 or the second layer 526 may be made of a clad metal, which is a double-layered metal material.

For example, when the joining of the layers is formed through a brazing process, the first layer 524 may be 3000 series aluminum, and the second layer 526 may be a clad metal containing 3000 series and 4000 series aluminum. Since the second layer 526 includes the clad metal, the temperature of the brazing process can be set to a level of 600° C., whereby the deformation of the shape of the aluminum during the joining process can be prevented.

The above-mentioned joining methods may also be used even when coupling the upper plate 510 and the lower plate 520. Therefore, when the physical properties of the upper plate 510 and the lower plate 520 are the same, the junction between the two members can be more densely formed. For example, the upper plate 510 and the lower plate 520, or the first layer 524 and the second layer 526 may include aluminum.

Meanwhile, in the lower plate 520 provided with the fragile part 522 as described above, the case where the lower surface of the lower plate 520 has a flat shape has been mainly described.

However, the step difference portion, i.e., the groove, of the lower plate 520 formed by locally adjusting the thickness may not face the inside of the cooling member 500 but may be exposed to the outside.

FIG. 9 is a diagram showing another example of the cross section A-A of FIG. 3. FIG. 10 is a diagram showing that another example of a cooling member according to an embodiment of the present disclosure is provided in a battery cell stack. FIG. 11 is an enlarged view of region C of FIG. 10, which is a diagram for explaining a change in the lower plate when the battery cell ignites. FIG. 12 is a cross-sectional view showing another example of a cooling member according to an embodiment of the present disclosure.

Referring to FIGS. 9 to 12, unlike the fragile part 522 of FIGS. 5 to 8 formed to be located close to the lower surface of the lower plate 520, the fragile part 522 may be formed to be located close to the upper surface of the lower plate 520. When the fragile part 522 is located close to the upper surface of the lower plate 520 as shown in FIGS. 9 to 12, a lower surface of the cooling member 500 may have a locally protruding shape. Therefore, the protruding lower surface of the cooling member 500 may be located close to the battery cell or may be in contact with the battery cell, thereby promoting heat dissipation of the battery cell.

As shown in FIG. 9, the cross section of the lower plate 520 can have a square, triangular, round, or trapezoidal cross-sectional shape. Since the cross-sectional shape of FIG. 9 can be explained with reference to the contents of FIG. 5 except that the vertical direction is reversed, a detailed description thereof will be omitted.

FIGS. 10 and 11 are diagrams showing a cross section cut in the xz plane when the cooling member 500 is shown on the battery cell stack, and the direction thereof is different from that of FIGS. 6 and 7 described above, and thus, the cross section of the cooling member 500 is illustrated in more detail. In FIGS. 6 and 7, if the positional relationship between the plurality of battery cells 110 and the fragile part 522 is shown, whereas in FIGS. 10 and 11, the positional relationship between one battery cell 110 and the fragile part 522 is shown. Referring to FIGS. 10 and 11, one battery cell 110 may correspond to a plurality of fragile parts 522, and the fragile part 522 corresponding thereto may be opened depending on the position where the ignition occurs among the battery cells 110. Therefore, when the battery cell 110 ignites, one fragile part 522 may be opened, or a plurality of fragile parts 522 may be opened. Here, the opening of the fragile part 522 includes a case where only a part of one fragile part is opened, and does not necessarily mean that the entire fragile part 522 is opened.

FIGS. 10 and 11 not only are different from that of FIGS. 6 and 7 in the direction but also shows a difference in that the lower surface of the cooling member 500 has a protruding shape. Even if the lower surface of the cooling member 500 has a protruding shape, the fragile part 522 is opened when the battery cell 110 ignites, so that injecting the coolant into the battery cell 110 is the same, whereby a detailed description of FIGS. 10 and 11 may be described with reference to FIGS. 6 and 7. Therefore, a detailed description will be omitted to avoid duplicate description.

Meanwhile, the lower plate 520 with a protruding lower surface and the fragile part 522 formed thereon may be formed in various ways. For example, the fragile part 522 may be formed by etching the lower surface of the lower plate 520. In another example, the lower plate 520 may be formed by joining two layers.

Specifically, as shown in FIG. 12, the lower plate 520 may be formed by joining a first layer 524 provided as a plate-shaped member and a second layer 526 having a plurality of holes. At this time, the second layer 526 may be located under the first layer 524 to thereby form the lower surface of the lower plate 520. Here, when the junction between the second layer 526 and the first layer 524 is formed by a brazing process, the first layer 524 may include 3000 series and 4000 series clad metal, and the second layer 526 may include 3000 series aluminum. At this time, the upper plate 510 may also be a 3000 series aluminum, the junction between layers can be smoothly performed through the 4000 series aluminum formed on the upper and lower surfaces of the first layer 524 provided as the clad metal. Alternatively, the first layer 524 may be provided as 3000 series aluminum, and the second layer 526 or upper plate 510 may be provided as 3000 series or 4000 series clad metal.

Other joining methods of the lower plate 520 and detailed descriptions of the first layer 524 and the second layer 526 may be explained with reference to the description of FIG. 8, and thus, a detailed description thereof will be omitted.

Next, a cooling member according to another embodiment of the present disclosure will be described.

FIG. 13 is a cross-sectional view showing a cooling member according to another embodiment of the present disclosure.

The cooling member 500 of the embodiment explained with reference to FIG. 13 can include all of the contents of FIGS. 1 to 12 described above in addition to those mentioned below. Therefore, in order to minimize duplicate description, the contents overlapping with those described above will be omitted.

Referring to FIG. 13, the cooling member 500 of the present embodiment may have three layers. Specifically, the upper plate 510 of the cooling member 500 may have one layer, and the lower plate 520 may have two layers. Here, since the lower plate 520 having two layers has been sufficiently explained through the contents described above, a detailed description thereof will be omitted.

Since the coolant in the cooling member 500 is contained between the upper plate 510 and the lower plate 520, a flow rate deviation of the coolant may be determined according to a separation distance between the upper plate 510 and the lower plate 520. In the above drawings, the upper plate 510 of the cooling member 500 is shown to have a flat surface as a whole except for the flow path forming groove 550 and the deformation preventing groove 560. Therefore, the flow rate deviation of the cooling member 500 may depend on the thickness difference of the lower plate 520. Specifically, the flow rate per unit length is relatively large around the first part where the fragile part 522 is formed, and a flow rate per unit length may be relatively small around the second part where the fragile part 522 is not formed. If the flow rate around the first part is larger, the coolant can be injected faster according to the hydraulic pressure when the fragile part 522 is opened. Therefore, as the flow rate around the first part is larger, it may be more preferable.

Therefore, in the present embodiment, the upper plate 510 having the bent part 514 may be provided so that a flow rate deviation of the coolant in the cooling member 500 is formed. The bent part 514 may have a wavy cross-sectional shape based on a cross-section in the longitudinal direction of the cooling member 500. Here, based on the cross-section, the highest point of the bent part 514, that is, a crest may correspond to the first part of the lower plate 520 in which the fragile part 522 is formed. Further, the lowest point of the bent part 514, that is, a trough may correspond to the second part of the lower plate 520. By corresponding the crest of the bent part 514 with the first part, the flow rate per unit length around the first part can be increased, and when the fragile part 522 is opened, the coolant of the cooling member 500 may be injected more rapidly toward the first battery cell 110*a* in which the ignition phenomenon occurs.

In FIG. 13, the trough of the bent part 514 is shown to be located adjacent to the second part of the lower plate 520, but the trough of bent part 514 can be spaced away from the second part of the lower plate 520 so that the cooling member 500 can hold a greater amount of coolant. However, if the separation distance is too large, the total volume of the cooling member 500 may increase, which may be a factor increasing the size of the battery module. Therefore, the cooling member 500 may have to be appropriately designed in consideration of the amount of heat generated by the battery cell 110.

Further, in FIG. 13, the layers of the cooling member 500 are shown to be located in the order of the first layer 524, the second layer 526, and the upper plate 510, but it can also be located in the order of the second layer 526, the first layer 524, and the upper plate 510. If the second layer 526 is located below the first layer 524, the lower surface of the cooling member 500 may have a protruding shape due to the second layer 526. Since the second layer 526 forming the lower surface of the cooling member 500 may be located close to the battery cell or may be in contact with the battery cell, the effect of promoting heat dissipation of the battery cell by the second layer 526 may exhibit if it is located in the order of the second layer 526, the first layer 524, and the upper plate 510.

Further, in the cooling member 500 provided as shown in FIG. 13, the thickness of each layer may be appropriately designed so as to have a strength greater than or equal to a predetermined range while minimizing the overall volume. For example, in the cooling member 500 having three layers, the upper plate 510 may be referred to as a third layer and may be made of aluminum. When the third layer is formed of aluminum, the upper plate 510 may be preferably formed to have a thickness of 1.0 to 2.0 mm, 1.3 to 1.7 mm, or 1.5 mm. Further, the second layer 526 included in the lower plate 520 may be preferably formed to have a thickness of 1.0 to 1.5 mm, 1.2 to 1.4 mm, or 1.3 mm. The first layer 524 may have to be formed thin enough to have the properties of the fragile part 522, and specifically, it may have a thickness of 0.03 to 0.07 mm, or 0.04 to 0.06 mm.

Various processes can be applied for interlayer coupling in the cooling member 500 having three layers. Since the coolant is located in the cooling member 500, the combination of the three layers needs to be firmly formed.

In one example, the coupling of the three layers may be formed through a welding process. In another example, the coupling of the three layers may be formed through a rolling process. However, when a rolling process applying pressure via a roller is applied, the formation of the upper plate 510 may be slightly limited.

Meanwhile, when the lower plate 520 is formed through the coupling of three layers, the material of the three layers may be different, respectively, and may be the same or similar materials to each other. Since the melting point or strength appear differently depending on the material, the material may have to be selected according to the manufacturing method, or the manufacturing method may have to be selected according to the material.

For example, in the structure shown in FIG. 13, when the junction of the layers is formed through brazing, the first layer 524 may be 3000 series aluminum, the second layer 526 may be a clad metal containing 3000 series or 4000 series aluminum, and the third layer, which is the upper plate 510, may be 3000 series aluminum.

In another example, the positions of the first layer 524 and the second layer 526 in the structure shown in FIG. 13 may be interchanged. At this time, when the junction of the layers is formed through brazing, the materials of the second layer 526 and the upper plate 510 coupled with the first layer 524 are limited according to the physical properties of the first layer 524. In a specific example, the first layer 524 includes 3000 series aluminum, and the second layer 526 and the upper plate 510 may include a clad metal containing 3000 series/4000 series aluminum. In another specific example, the first layer 524 includes a 3000 series/4000 series clad metal, and the second layer 526 and the upper plate 510 may include 3000 series aluminum.

Next, a battery pack including the above-mentioned cooling member will be described.

The battery pack 1000 of the embodiment described with reference to FIGS. 14 and 15 can include all the contents of FIGS. 1 to 13 in addition to those described below. Therefore, in order to minimize duplicate description, the above-mentioned contents related to the cooling member 500 will be omitted.

FIG. 14 is an exploded perspective view showing a battery pack according to embodiments of the present disclosure. FIG. 15 is a perspective view of a battery module included in the battery pack according to FIG. 14.

Referring to FIG. 14, a battery pack 1000 according to an embodiment of the present disclosure may comprise at least one battery module 100, a pack frame 200 for accommodating the battery module 100, a resin layer 300 formed on the inner surface of the pack frame 200, an end plate 400 that closes the open surface of the pack frame 200, and a cooling member 500 disposed between the pack frame 200 and the battery cell stack 120. However, the components contained in the battery pack 1000 are not limited thereto, and depending on the design, the battery pack 1000 may be provided in a state where some of the above-described components are omitted, and may be provided in a state in which other components not mentioned are added.

Referring to FIGS. 14 and 15, the battery module 100 provided in the present embodiment may have a module-less structure in which the module frame is omitted.

Conventionally, conventional battery packs have a double assembly structure in which a battery cell stack and partial components connected thereto are assembled to form a battery module, and the plurality of battery modules are accommodated in the battery pack again. At this time, since the battery module includes a module frame that forms the outer surface thereof, conventional battery cells are doubly protected by the module frame of the battery module and the pack frame of the battery pack. However, such a dual assembling structure has a disadvantage that not only the manufacturing cost and manufacturing process of the battery pack are increased, but also when a defect occurs in some battery cells, reassembling property is deteriorated. In addition, when a cooling member, or the like is present outside the battery module, there is a problem that the heat transfer path between the battery cell and the cooling member is somewhat complicated.

Therefore, the battery module 100 of the present embodiment may be provided in the form of a ‘cell block’ in which the module frame is omitted, and the battery cell stacks 120 contained in the cell block can be directly coupled to the pack frame 200 of the battery pack 1000. Thereby, the structure of the battery pack 1000 can be simplified, advantages in terms of manufacturing cost and manufacturing process can be obtained, and the weight reduction of the battery pack can be achieved.

In the following, the battery module 100 without a module frame may be referred to as a 'cell block' to distinguish it from a battery module having a module frame. However, the battery module 100 is a generic term having the battery cell stack 120 segmented into a predetermined unit for modularization regardless of the presence or absence of the module frame, and the battery module 100 should be construed as including both a typical battery module having a module frame and a cell block.

Referring to FIG. 15, the battery module 100 of the present embodiment may comprise a battery cell stack 120 in which a plurality of battery cells 110 are stacked in one direction, side surface plates 130 located at both ends in the stacking direction of the battery cell stack 120, a holding strap 140 that wraps around the side surface plate 130 and the battery cell stack 120 to fix its shape and a busbar frame 150 for covering the front and rear surfaces of the battery cell stack 120.

Meanwhile, FIG. 15 shows the battery module 100 provided in the form of a cell block, but the contents of these figures do not exclude the case of applying the battery module 100 of the sealed structure having the module frame to the battery pack 1000 of the present embodiment.

The battery cell 110 may include an electrode assembly, a cell case, and an electrode lead protruding from the electrode assembly, respectively. The battery cells 110 may be provided in a pouch shape or a prismatic shape in which the number of stacked cells per unit area can be maximized. For example, the battery cell 110 provided in a pouch type can be manufactured by accommodating an electrode assembly including a positive electrode, a negative electrode, and a separator in a cell case made of a laminated sheet and then heat-sealing a sealing part of the cell case. Meanwhile, FIGS. 14 and 15 show that the positive electrode lead and the negative electrode lead of the battery cell 110 protrude in opposite directions to each other, but it is not necessarily the case, and the electrode leads of the battery cell 110 can be protruded in the same direction.

The battery cell stack 120 may be one in which a plurality of electrically connected battery cells 110 are stacked in one direction. A direction in which the plurality of battery cells 110 are stacked (hereinafter referred to as a 'stacking direction') may be a y-axis direction (or a −y-axis direction) as shown in FIGS. 14 and 15, and in the following, the expression 'axial direction' may be interpreted as including all +/− directions).

Meanwhile, as the battery cell 110 is disposed along one direction, the electrode leads of the battery cell 110 may be located on one surface or one surface and the other surface facing the one surface of the battery cell stack 120. In this manner, the surface on which the electrode leads are located in the battery cell stack 120 may be referred to as the front surface or the rear surface of the battery cell stack 120, and in FIGS. 14 and 15, the front surface and the rear surface of the battery cell stack 120 are shown as two surfaces facing each other on the x-axis.

Further, in the battery cell stack 120, the surface on which the outermost battery cell 110 is located may be referred to as a side surface of the battery cell stack 120, and in FIGS. 14 and 15, the side surface of the battery cell stack 120 is shown as two surfaces facing each other on the y-axis.

The side surface plate 130 may be provided to maintain the overall shape of the battery cell stack 120. The side surface plate 130 is a plate-shaped member, and can supplement the stiffness of the cell block instead of the module frame. The side surface plate 130 may be disposed at both ends in the stacking direction of the battery cell stack 120, and may be in contact with the outermost battery cells 110 on both sides of the battery cell stack 120.

The side surface plate 130 may be manufactured from various materials, and may be provided by various manufacturing methods. In one example, the side surface plate 130 may be made of a plastic material manufactured by injection molding. In another example, the side surface plate 130 may be made of a leaf spring material. In another example, the side surface plate 130 may be made of a material having elasticity so that its shape may be partially deformed in response to a volume change of the battery cell stack 120 due to swelling.

The holding strap 140 can be for fixing the position and shape of the side surface plates 130 at both ends of the battery cell stack 120. The holding strap 140 may be a member having a length and a width. Specifically, the battery cell stack 120 may be located between the two side surface plates 130 in contact with the outermost battery cell 110, and the holding strap 140 may cross the battery cell stack 120 to connect the two side surface plates 130. Thereby, the holding strap 140 can prevent the distance between the two side surface plates 130 from increasing beyond a certain range, whereby the overall shape of the cell block can be maintained within a certain range.

The holding strap 140 may have hooks at both terminal ends in the longitudinal direction for stable coupling with the side surface plate 130. The hook may be formed by bending both terminal ends of the holding strap 140 in the longitudinal direction. Meanwhile, the side surface plate 130 may have a hook groove formed at a position corresponding to the hook, and the holding strap 140 and the side surface plate 130 can be stably coupled through the coupling of the hook and the hook groove.

The holding strap 140 may be provided with various materials or through various manufacturing methods. In one example, the holding strap 140 may be made form a material having elasticity, through which the volume change of the battery cell stack 120 due to swelling can be allowed within a certain range.

Meanwhile, the holding strap 140 is for fixing the relative position between the side surface plate 130 and the battery cell stack 120, and if the purpose of the 'fixing member' is achieved, it may be provided in a shape other than those shown. For example, the fixing member may be provided in the form of a long bolt that can cross between the two side surface plates 130, that is, a long bolt. The side surface plate 130 may be provided with a groove into which the long bolt can be inserted, and the long bolt may be simultaneously coupled with the two side surface plates 130 through the groove to thereby fix the relative positions of the two side surface plates 130. The long bolt may be provided at an edge of the side surface plate 130, preferably at a position close to the vertex of the side surface plate 130. Depending on the design, it is possible to replace the holding strap 140 with the above-mentioned long bolt, but both the holding strap 140 and the long bolt can also be provided in the cell block.

The busbar frame 150 can be for covering one surface of the battery cell stack 120, and at the same time, guiding the connection between the battery cell stack 120 and an external device by being located on one surface of the battery cell stack 120. The busbar frame 150 may be located on the front surface or rear surface of the battery cell stack 120. Two busbar frames 150 may be provided so as to be located on the front surface and the rear surface of the battery cell stack 120.

A busbar may be mounted on the busbar frame 150, through which the electrode lead of the battery cell stack 120 is connected to the busbar, so that the battery cell stack 120 may be electrically connected to an external device.

The busbar frame 150 may include an electrically insulating material. The busbar frame 150 can restrict contact of the busbar with other portions of the battery cells 110 other than the portion joined to the electrode lead, and can prevent an electrical short circuit from occurring.

The pack frame 200 can be for protecting the battery module 100 and the electrical equipment connected thereto from external physical impact. The pack frame 200 may accommodate the battery module 100 and electrical equipment connected thereto in the inner space of the pack frame 200. Here, the pack frame 200 includes an inner surface and an outer surface, and the inner space of the pack frame 200 may be defined by the inner surface.

The battery modules 100 accommodated in the pack frame 200 can be formed in plural numbers. The plurality of battery modules 100 may be referred to as a 'module assembly'. The module assemblies can be arranged in rows and columns within the pack frame 200. Here, the 'row' may mean a set of battery modules 100 arranged in one direction, and the 'column' may mean a set of battery modules 100 arranged in a direction perpendicular to the one direction. For example, the battery modules 100 may be arranged along the stacking direction of the battery cell stack as shown in FIG. 1 to form one row or column, thereby forming a module assembly.

The pack frame 200 may be provided in an open hollow shape along one direction. For example, as shown in FIG. 1, a plurality of battery modules 100 are consecutively located along the stacking direction of the battery cells 110, and the pack frame 200 may have an open hollow shape along the above-mentioned stacking direction.

The pack frame 200 may have various structures. In one example, as shown in FIG. 1, the pack frame 200 may include a lower frame 210 and an upper frame 220. Here, the lower frame 210 may be provided in a plate shape, and the upper frame 220 may be provided in a U-shape. At least one battery module 100 may be arranged in the plate-shaped lower frame 210, and a U-shaped upper frame 220 may be provided so as to wrap the upper surface of the module assembly and two surfaces on the x-axis.

The pack frame 200 may include a portion having high thermal conductivity in order to rapidly dissipate heat generated in the inner space to the outside. For example, at least a part of the pack frame 200 may be made from a metal having high thermal conductivity, and examples thereof may be aluminum, gold, silver, copper, platinum, or an alloy containing these, and the like. In addition, the pack frame 200 may have a partially electrical insulating property, and an insulating film may be provided at a position where insulation is required, or an insulating coating can be applied. A portion of the pack frame 200 to which an insulating film or insulating coating is applied may be referred to as an insulating part.

A resin layer 300 may be provided between the battery module 100 and the inner surface of the pack frame 200. The resin layer 300 may be provided between the bottom surface of the battery module 100 and the lower frame 210. The resin layer 300 can be provided between the upper surface of the battery module 100 and the upper frame 220. Here, specifically, the resin layer 300 may be provided between the cooling member 500 and the upper frame 220, which will be described later.

The resin layer 300 may be formed by injecting a resin between one of the inner surfaces of the battery cell stack 120 and the pack frame 200. However, it is not necessarily the case, and the resin layer 300 may be a member provided in a plate shape.

The resin layer 300 can be made from various materials, and the function of the resin layer 300 can vary depending on the material. For example, the resin layer 300 may be formed from an insulating material, and electron transfer between the battery module 100 and the pack frame 200 can be prevented through the insulating resin layer 300. In another example, the resin layer 300 may be formed of a thermally conductive material. The resin layer 300 made of a thermally conductive material transfers heat generated in the battery cell 110 to the pack frame 200, so that heat can be released/transferred to the outside. In other example, the resin layer 300 may include an adhesive material, through which the battery module 100 and the pack frame 200 can be fixed to each other. In a specific example, the resin layer 300 may be provided so as to include at least one of a silicone-based material, a urethane-based material, and an acrylic-based material.

The end plate 400 can be for protecting the battery module 100 and the electrical components connected thereto from external physical impact by sealing the open surface of the pack frame 200. Each edge of the end plate 400 can be coupled to a corresponding edge of the pack frame 200 by a method such as welding. The end plates 400 can be provided in two numbers so as to seal two open surfaces of the pack frame 200, and may be made of a metal material having a predetermined strength.

An opening 410 may be formed in the end plate 400 to expose the inlet/outlet port 530 of the cooling member 500, which will be described later, and a connector 420 for low voltage (LV) connection or high voltage (HV) connection with an external device can be mounted.

The cooling member 500 may be for cooling the inside of the battery pack 1000 by dissipating heat generated from the battery cells 110. For the description of the cooling member 500, refer to the contents described above.

Meanwhile, in FIG. 14, it is shown that the cooling member 500 is provided outside the battery module 100, but it is not necessarily the case, and the cooling member 500 can also be arranged inside the battery module 100. At this time, the battery module 100 may have a closed structure having a module frame or an opened structure such as a cell block.

Further, in the above-mentioned figures, the cooling member 500 is shown as having an independent structure, but the cooling member 500 may be provided integrally with the battery pack 1000 or the battery module 100. For example, when the cooling member 500 is provided integrally with the battery pack 1000, the upper plate 510 of the cooling member 500 is replaced with the upper surface of the pack frame 200, and the upper surface of the pack frame 200 and the lower plate 520 of the cooling member 500 are coupled, thereby capable of forming a cooling member 500. In another example, when the cooling member 500 is provided integrally with the battery module 100, the upper plate 510 of the cooling member 500 is replaced with the upper surface of the frame of the battery module 100, and the upper surface of the frame of the battery module 100 and the lower plate 520 of the cooling member 500 are coupled, thereby capable of forming a cooling member 500. When the cooling member 500 is integrated with the battery pack 1000 or the battery module 100, effects such as weight reduction, cost reduction, and simplification of the internal structure of the battery pack 1000 or the battery module 100 can be achieved by omitting some members.

Further, the battery module 100 of the present embodiment has been described as including a water-cooled type cooling member 500, but this description does not exclude that the battery module 100 may include an air-cooled type cooling member. Therefore, it should be noted that the battery module 100 of the present embodiment may include an air-cooled type and a water-cooled type cooling member 500 at the same time.

Next, a cooling member according to another embodiment of the present disclosure will be described.

FIG. 16 is a perspective view showing a cooling member according to another embodiment of the present disclosure. FIG. 17 is a top view showing the cooling member according to an embodiment of the present disclosure. FIG. 18 is a top view of a lower plate included in the cooling member of FIG. 16. FIG. 19 is a top view of a body included in the cooling member of FIG. 16. FIG. 20 is a diagram showing the coupling of the lower plate, the main body, and the cooling hose included in the cooling member of FIG. 16. FIG. 21 is a diagram showing the cooling member of FIG. 17 cut along the line A-A, showing that coolant flows into and out of the main body and the cooling hose. FIG. 22 is a cross-sectional view taken along line A-A of the cooling member of FIG. 17, showing injection of coolant through the cooling hose when the battery cell ignites.

Referring to FIGS. 16 and 17, the cooling member 600 of the present embodiment can be provided to lower the internal temperature of a battery module or battery pack including a battery cell. The cooling member 600 may be a water-cooled type cooling member 600 into which a refrigerant or coolant is injected. By providing the cooling member 600 in a water-cooled manner, the cooling efficiency of the cooling member 600 can be uniformly maintained, and the battery cells within the battery module or battery pack can be uniformly cooled. At this time, the coolant used in the cooling member 500 can use one of known ones or a mixture thereof, and if the heat of the battery cells can be dissipated by moving along the flow path inside the cooling member 600, any of known ones can be used.

The cooling member 600 may be arranged on one surface of the battery cell stack to dissipate the heat of the battery cells. The cooling member 600 can be arranged in parallel with the stacking direction of the battery cell stack so as to be located close to the plurality of battery cells of the battery cell stack. Specifically, the cooling member 600 may be located on the upper part of the battery cell stack.

The size of the cooling member 600 may be matched with the size of the battery cell stack to which the cooling member 600 is applied. In one example, the cooling member 600 may be provided so as to correspond to one battery cell stack, wherein the length of the cooling member 600 may be matched with the length of the battery cell stack, or may be formed larger or smaller with a slight margin, and the width of the cooling member 600 may be matched with the width of the battery cell stack, or may be formed larger or smaller with a slight margin. In another example, the cooling member 600 may be provided so as to correspond to a plurality of battery cell stacks, wherein the length and width of the cooling member 600 may match with the length and width of the plurality of battery cell stacks, or may be formed larger or smaller with a slight margin. Here, the cooling member 600 may be located inside the battery module, but it can also be located at the inside of the battery pack from the outside of the battery module.

The cooling member 600 may include a lower plate 620, an inlet/outlet port 630 that injects coolant into the inside of the cooling member 600, a main body 640 and a cooling hose 650 that are mounted on the upper surface of the lower plate 620 and houses the coolant, and a fixing member 660 for fixing them. Referring to FIG. 20, the main body 640 is mounted on the upper surface of the lower plate 620, the cooling hose 650 is mounted on the housing part 648 of the main body 640, and the fixing member 660 fixes the lower plate 620, the main body 640, and the cooling hose 650, thereby capable of manufacturing the cooling member 600.

The cooling member 600 of the present embodiment may secure watertightness and simplify the manufacturing process through the above-mentioned structure, and can supply coolant to the right place at the right time when the battery cell ignites.

When ignition occurs in a battery cell, it may be effective to inject a liquid such as coolant into the battery module or battery pack in order to effectively suppress it. Having a liquid tank inside the battery module or battery pack may have the problem of increasing the volume of the battery module and battery pack. Therefore, conventionally, a separate water tank is provided outside the battery module and the battery pack, and coolant or the like is injected into the battery module or battery pack through a nozzle or the like extending from the water tank only when ignition of the battery cell was confirmed through the sensor.

However, the water tank provided outside the battery module and the battery pack has the problem that its volume is large and also the user has to manage it separately. Further, the conventional water injection system must be equipped with a separate control unit or communication unit for determining whether to inject a coolant, must not cause an error in their operation, and must go through a number of determination processes even if it operates normally, which takes a lot of time. Even after deciding to inject coolant, if the path from the water tank to the battery cell inside the battery module or battery pack is slightly long, it is difficult to quickly provide coolant from the water tank to the battery cells, and thus, it is difficult to suppress the continuous thermal runaway phenomenon in which the conventional water injection system proceeds rapidly. Therefore, in the present embodiment, when ignition occurs inside the battery module or battery pack, an opening may be formed in the lower plate 620 of the cooling member 600 and the cooling hose 650 may be arranged to correspond to the opening, so that the coolant can be immediately supplied to the fire site.

In order to achieve an effect similar to the above, an opening is formed in the lower surface of a convention cooling member, and then the opening may be closed by filling or inserting a member that melts or fractures at a predetermined temperature or pressure or higher. However, in the conventional structure in which the coolant of the cooling member 600 directly contacts the lower plate 620, coolant may leak through the gap between the opening of the lower plate 620 and the member sealing it, and accordingly, the watertightness of the cooling member 600 may be greatly reduced. In addition, since manufacturing the lower plate 620 so as to include two materials having different physical properties involves a complicated manufacturing process, there is a problem in that the manufacturing time and manufacturing cost increase. Therefore, in the cooling member 600 of the present embodiment, by isolating the coolant between the main body 640 and the cooling hose 650, the deterioration of the watertightness can be minimized due to the opening 622 of the lower plate 620. In addition, by applying the main body 640 and the cooling hose 650 to the cooling member 600, the manufacturing process of the cooling member 600 may be simplified, and the manufacturing time and cost may be reduced.

Referring to FIG. 18, the lower plate 620 may be provided in a plate shape. A main body 640 through which coolant flows and a cooling hose 650 may be mounted on the lower plate 620. The lower plate 620 may be preferably provided in a plate shape to support the main body 640 and the like.

The lower plate 620 may include at least one opening 622. The opening 622 may be for injecting internal coolant to the battery cell by heat or pressure generated due to the ignition during internal ignition of the battery cell. The opening 622 may be provided in plural numbers along a straight line parallel to the short or long side of the lower plate 620, and the cooling member 600 has a plurality of openings 622, so that coolant can be injected in response to a fire occurring at an unspecified location in the battery module or battery pack. In this regard, refer to FIG. 22 described later.

A protrusion 624 extending from one side of the lower plate 620 and continuously located along one edge of the lower plate 620 may be formed around the lower plate 620. The protrusion 624 may be disposed in contact with or adjacent to an electrode lead of each battery cell stack or a busbar connected to the electrode lead. Since the electrode lead or busbar that provides electrical connection in the battery module or battery pack is a configuration that is prone to heat generation, the temperature rise of the battery cell can be more effectively prevented if the above-mentioned protrusion promotes heat dissipation of the electrode lead or the busbar.

A berm 626 may be formed on the lower plate 620. The berm 626 may extend along the longitudinal direction of the cooling member 600 from the center in the width direction of the cooling member 600 except for a predetermined section. The main body 640 may be mounted in a fixed position by the berm 626, and the fixing member 660 may be stably fixed. Here, the width direction of the cooling member 600 may be a direction parallel to the short side of the cooling member 600. Further, here, the longitudinal direction of the cooling member 600 may be a direction parallel to the long side of the cooling member 600.

The lower plate 620 may be a portion located closest to the battery cell in the cooling member 600. The lower plate 620 may be provided with a material having high thermal conductivity to promote heat dissipation of the battery cells. The lower plate 620 of the cooling member 600 can be made of a metal with high rigidity, and specific examples thereof include aluminum, gold, silver, copper, platinum, or an alloy containing these.

The coolant may be supplied through the inlet port 632 located side by side and discharged to the outlet port 634. The inlet port 632 and the outlet port 634 may be located side by side in parallel on one end side of the cooling member 600. This may be for simplifying the design regarding the inflow and discharge of the coolant supplied from the outside of the battery module or battery pack. Further, this can be for minimizing the temperature difference between the periphery of the inlet port 632 and the periphery of the outlet port 634. Specifically, the coolant flowing into the inlet port 632 may have the lowest temperature, and the coolant discharging to the outlet port 634 may have the highest temperature. Therefore, when the inlet/outlet ports 630 are arranged adjacent to each other, mutual heat exchange occurs, so that a temperature deviation of the entire coolant flowing through the inner space of the cooling member can be minimized. Therefore, by arranging the inlet/outlet ports 630 side by side, the cooling member 600 can have uniform heat dissipation performance as a whole.

Referring to FIGS. 19 to 21, the main body 640 may provide a coolant flow path for heat dissipation of the battery cells. The coolant injected through the inlet port 632 may be housed inside the body 640, and the coolant housed in the main body 640 may be discharged through the outlet port 634. As the coolant flows into or out of the main body 640, the cooling member 600 may be maintained at a relatively constant temperature. The coolant in the main body 640 can be designed to be continuously circulated by being connected to an external heat exchanger connected to the inlet/outlet port 630 in order to maintain its temperature constancy.

The lower plate 620 cooled by the main body 640 may promote heat dissipation of the battery cells. The main body 640 may be made of a material having high thermal conductivity, which can quickly absorb the heat of the lower plate 620. The body 640 may be made of a material having sufficient rigidity to withstand the pressure and weight of the coolant contained therein. The main body 640 may be made of the same or similar material as that of the lower plate 620. The material of the body 640 may include, for example, aluminum, gold, silver, copper, platinum, or an alloy containing these.

The main body 640 may be mounted at a position where the berm 626 is not formed in the lower plate 620. The outer shape of the main body 640 may be similar to the outer shape of the lower plate 620 except for the protrusion 624.

The main body 640 may have a square tubular shape, and considering the location of the berm 626, the inlet port 632 and the outlet port 634 may be branched into two parts corresponding to each other. Thereby, the main body 640 may form a U-shaped flow path. The main body 640 may include a first part 642 extending from the inlet port 632 along a straight line parallel to the longitudinal direction of the cooling member 600, a second part 644 extending along a curved line rotating in a clockwise or counterclockwise direction at the distal end of the first part 642, and a third part 646 extending along a straight line parallel to the longitudinal direction of the cooling member 600 toward the outlet port 634 at the distal end of the second part 644. Here, the longitudinal direction of the cooling member 600 may be a direction parallel to the long side of the cooling member 600.

The main body 640 may include a housing part 648 to which the cooling hose 650 is mounted. The housing part 648 may mean a housing space in which the cooling hose 650 is mounted in the main body 640. The housing part 648 may be a long groove extending along the longitudinal direction of the cooling member 600, and the cross section of the housing part 648 may be polygonal, such as square, or circular. Both ends of the cooling hose 650 in the longitudinal direction may be connected to both ends of the housing part 648 in the longitudinal direction. Both ends of the cooling hose 650 may be inserted into both ends of the housing part 648 in the longitudinal direction. Connection portions between both ends of the housing part 648 in the longitudinal direction and both ends of the cooling hose 650 can be sealed to secure watertightness. For example, a gasket is provided at the connection portion between the cooling hose 650 and the housing part 648, and watertightness between the two members can be secured through the gasket.

In another example, both ends of the cooling hose 650 may be formed with extensions extending in the circumferential direction from the end of the cooling hose 650, and the expanded part is inserted into the distal end of the housing part 648 and located inside the main body 640, so that the coupling between the cooling hose 650 and the main body 640 can be supplemented. In another example, a first extension extending in a circumferential direction and a second extension spaced apart from the first extension may be formed at the distal end of the cooling hose 650. The first extension may be located on the inside of the main body 640, and the second extension may be located on the outside of the main body 640. Since the two extensions are in close contact with the main body 640, the coupling between the cooling hose 650 and the main body 640 can be further supplemented. Further, at this time, a protrusion may be formed on the extension part, the first extension part, or the second extension part, which may be more closely coupled with one side of the body 640 via a protrusion.

The cooling hose 650 can be connected to the main body 640 to provide a flow path to coolant that realizes heat dissipation of the battery cells. The coolant inflowing from the inlet/outlet port 630 may move to the cooling hose 650. The cooling hose 650 may be fed with coolant from the main body 640 located close to the inlet/outlet port 630.

The cooling hose 650 may be located to correspond to the opening 622 of the lower plate 620. When the openings 622 in 4 rows are formed in the lower plate 620 along a straight line parallel to the longitudinal direction of the cooling member 600 as shown in FIG. 18, four cooling hoses 650 can be provided to correspond to each row of the openings 622. Here, the 'row' may collectively refer to the openings 622 consecutively located along a straight line parallel to the longitudinal direction of the cooling member 600.

Referring to FIG. 22, the cooling hose 650 may melt or fractures, when an internal fire occurs, thereby injecting internal coolant toward the battery cell. When the battery cell ignites, a part of the cooling hose 650 corresponding to the opening 622 is opened by being melted or fractured, whereby the fire in the battery cell located below the cooling member 600 can be suppressed by spraying, ejecting, and inflowing the coolant in the direction of gravity. Meanwhile, in order to realize this effect, the housing part 648 to which the cooling hose 650 is mounted should also be formed to correspond to the opening 622 of the lower plate 620.

The cooling hose 650 may be made of a material that is easily melted by heat or fractured by pressure than the lower plate 620 made of metal. For example, the cooling hose 650 may be made of a material having a melting point of 300° C. or less. In a specific example, the cooling hose 650 may be manufactured so as to include polyamide (PA). In another specific example, the cooling hose 650 may be manufactured so as to include a thermoplastic polymer resin having a melting point of 200° C. or less. Examples of the thermoplastic polymer resin include materials having a melting point of about 100° C. or more and 200° C. or less such as high density polyethylene (HDPE), polyethylene (PE), polypropylene (PP), or polyphenylene oxide (PPO).

Meanwhile, in order to achieve the above-mentioned effects, a configuration in which a part of the main body 640 is fractured to allow coolant to be injected can be possible, without separately manufacturing the cooling hose 650. However, in order for the main body 640 to withstand the pressure of the coolant flowing therein and maintain its shape, since the main body 640 must be made of a material having sufficient rigidity, being made of a material that is easily melted by heat or fractured by pressure has a problem that the overall durability of the cooling member 600 may be deteriorated. Therefore, configuring the cooling hose 650 that can be easily fractured by heat separately from the main body 640 as in the present embodiment may be preferable for improving the performance of the entire cooling member 650.

The fixing member 660 may be for supplementing the rigidity of the cooling member 600 by fixing the lower plate 620, the main body 640 and the cooling hose 650. The fixing member 660 may fix the positions of the main body 640 and the cooling hose 650 through coupling with the lower plate 620.

The fixing member 660 can be provided in the form of a strap having a length. The fixing member 660 may be located in parallel with the width direction of the cooling member 600. The fixing member 660 may be provided in plural numbers along the longitudinal direction of the cooling member 600, and the plurality of fixing members 660 may be arranged at uniform intervals.

The fixing member 660 may be made of a material having high rigidity in order to maintain the shape of the cooling member 600, and can be made of metal as an example.

The fixing member 660 may be coupled to both ends of the cooling member 600 in the width direction. The fixing member 660 may be coupled to the center of the cooling member 600 in the width direction. The fixing member 660 may include end coupling parts 662 each formed at both ends in the longitudinal direction of the fixing member 660, and a central coupling part 664 formed in the center in the longitudinal direction of the fixing member 660. The end coupling parts 662 and the central coupling part 664 may refer to portions fastened through a fastening member such as a rivet in the cooling member 600. A fastener into which a fastening member can be inserted may be formed in the end coupling parts 662 and the central coupling part 664.

The fixing member 660 may be coupled to both ends of the lower plate 620 in the width direction. The fixing member 660 may be coupled to the center of the lower plate 620 in the width direction. The end coupling parts 662 may be coupled to the protrusions 624 located at both ends of the lower plate 620 in the width direction. The central coupling part 664 may be coupled to the berm 626 located at the center of the lower plate 620 in the width direction. The end coupling parts 662 and the central coupling part 664 can be formed so as to have a step difference from the other part of the fixing member 660, and thereby may have a slightly lower height than other parts of the fixing member 660. Considering the shape of the protrusion 624 and the berm 626, the end coupling parts 662 may be formed so as to have a greater step difference than the central coupling part 664.

When the fixing member 660 is used in the manufacture of the cooling member 600 in this way, excessive heat is not generated during the manufacturing process as compared to the coupling method by the welding process, certain temperature-sensitive materials may not deform during manufacture. Therefore, by using the fixing member 660, the cooling member 600 can be manufactured so as to include two or more materials having different properties, and a structure of various materials and shapes can be applied to the cooling member 600, such as the cooling hose 650, and the design of the cooling member 600 may be easier and more versatile.

Next, a method of manufacturing a cooling member according to another embodiment of the present disclosure will be described. The manufacturing method of the cooling member 600 described below includes all the contents related to the cooling member 600 described above, and thus, a detailed description of overlapping contents are omitted.

Referring back to FIG. 20, a method of manufacturing a cooling member according to another embodiment of the present disclosure may include a step of preparing the lower plate 620, a step of mounting the main body 640 on the upper surface of the lower plate 620, a step of mounting the cooling hose 650 to the main body 640, and a step of coupling the fixing member 660 with the lower plate 620.

The step of preparing the lower plate 620 may include a step of forming an opening 622 in the lower plate 620, and may further include a step of mounting the inlet/outlet port 630 to the lower plate 620 according to the embodiment.

The step of mounting the main body 640 to the lower plate 620 is a process of joining the lower plate 620 and the main body 640, and can be performed by a joining process such as welding. When a welding process is used for joining the lower plate 620 and the main body 640, as the material of the lower plate 620 and the body 640 is more similar, deformation or damage of some members according to the welding temperature can be minimized, and dimensional safety of the cooling member 600 can be secured.

The step of mounting the cooling hose 650 to the main body 640 may include a step of inserting the cooling hose 650 into the housing part 648 of the main body 640, and a step of connecting both ends of the cooling hose 650 with both ends of the housing part 648. Here, the connection part between the cooling hose 650 and the housing part 648 may be sealed.

The step of coupling the fixing member 660 with the lower plate 620 may include a step of coupling the end coupling parts 662 of the fixing member 660 with both ends of the lower plate 620, and a step of coupling the central coupling part 664 of the fixing member 660 with the center of the lower plate 620. Here, both ends of the lower plate 620 mean the ends in the width direction, and protrusions 624 may be located at both ends of the lower plate 620. In addition, the center of the lower plate 620 means the center in the width direction, and the berm 626 may be located in the center of the lower plate 620.

Meanwhile, although not specifically mentioned above, the cooling fins 600 according to yet another embodiment of the present disclosure may be mounted within a battery module or a battery pack.

A battery module according to yet another embodiment of the present disclosure includes a battery cell stack made of a plurality of battery cells and a module frame for housing the same, and a cooling member 600 may be provided between the module frame and the battery cell stack.

The battery pack according to yet another embodiment of the present disclosure may be provided in various forms.

In one example, the battery pack according to embodiments of the present disclosure may include at least one or more of the battery modules described above. The battery pack of the present embodiment may include a pack frame and at least one battery module mounted in the pack frame, wherein the battery module includes a battery cell stack, a module frame, and a cooling member located between the battery cell stack and the module frame.

In another example, the battery pack according to yet another embodiment of the present disclosure may include at least one battery module including a battery cell stack and a module frame for housing the same, and a cooling member 600 and a pack frame for housing the battery module and the cooling member 600. That is, in this example, the cooling member 600 may be provided outside the battery module. The cooling member 600 may be provided between the module frame and the pack frame of the battery module, and coolant may be injected toward the battery module when the battery module ignites inside or outside.

In another example, the battery pack according to another embodiment of the present disclosure may include a battery cell stack and a pack frame for housing the same, and a cooling member 600 may be provided between the battery cell stack and the pack frame.

Here, the battery cell stack may be provided in a module-less structure that is not sealed by a module frame or the like. The battery cell stack may be provided in an open structure. At this time, the battery cell stack may be provided in a state in which its external shape is maintained through a fixing member such as a side surface plate or a holding strap, and this type of battery cell stack may be referred to as a cell block.

Typically, battery packs may be formed in a dual assembling structure in which a battery module is formed by assembling a battery cell stack and several parts connected thereto, and a plurality of battery modules are again housed in the battery pack. At this time, since the battery module includes a module frame that forms the outer surface thereof, conventional battery cells are doubly protected by the module frame of the battery module and the pack frame of the battery pack. However, such a double assembly structure not only increases the manufacturing unit cost and manufacturing process of the battery pack, but also has the drawback that reassembly is deteriorated when some battery cells are defective. In addition, when a cooling member or the like exists outside the battery module, there is a problem that the heat transfer path between the battery cell and the cooling member is somewhat complicated. Therefore, the battery cell stack of the present embodiment may be provided in a structure that is not sealed by the module frame, and may be directly coupled to the pack frame of the battery pack. Thereby, the structure of the battery pack becomes simpler, advantages in terms of manufacturing cost and manufacturing process can be obtained, and the weight reduction of the battery pack can be achieved. In addition, the battery cell stack herein is provided in a module-less structure, whereby the battery cell stack may be located closer to the cooling member 600 in the pack frame, and heat dissipation by the cooling member 600 may be more easily achieved.

For a description of a case in which the cooling member 600 according to another embodiment of the present disclosure is mounted in a battery module or a battery pack, reference may be made to the descriptions relating to FIGS. 14 and 15, and thus, detailed descriptions of overlapping contents are omitted.

Further, according to the present disclosure, it is not limited to the cooling member 500 described above in FIGS. 1 to 15 and the cooling member 600 described above in FIGS. 16 to 22, respectively, and even when these are combined, for example, by equally or partially modifying and applying the cooling member 500 described above in FIGS. 1 to 15 to the main body 640 of the cooling member 600 described above in FIGS. 16 to 22, various modifications and variations can be made.

Meanwhile, although not specifically mentioned above, the battery pack according to an embodiment of the present disclosure may include a battery management system (BMS) and/or a cooling device that manage the temperature or voltage of the battery.

The battery pack according to an embodiment of the present disclosure can be applied to various devices. The device to which the battery pack is applied may be a vehicle means such as an electric bicycle, an electric vehicle, or a hybrid vehicle. However, but the above-mentioned device is not limited thereto, and the battery pack according to the present embodiment can be used for various devices in addition to the above illustrations, which also falls within the scope of the present disclosure.

Although preferred embodiments of the present disclosure have been described in detail above, the scope of the present disclosure is not limited thereto, and various modifications and improvements made by those skilled in the art using the basic concepts of the present disclosure, which are defined in the appended claims, also falls within the scope of the present disclosure.

DESCRIPTION OF REFERENCE NUMERALS

100: battery module
110: battery cell
120: battery cell stack
130: side surface plate
140: holding strap
150: busbar frame
200: pack frame
300: resin layer
400: end plate
500: cooling member
510: upper plate
514: bent part
520: lower plate
522: fragile part
530: inlet/outlet port
540: sealing part
550: flow path forming groove
560: deformation prevention groove
600: cooling member
620: lower plate
630: inlet/outlet port
640: main body
650: cooling hose
660: fixing member

The invention claimed is:

1. A cooling member located in an upper part of a battery cell stack in which a plurality of battery cells are stacked, the cooling member comprising:

an upper plate, a lower plate, and a coolant incorporated in an inner space between the upper plate and the lower plate, wherein the lower plate comprises a first part in which a fragile part is formed, and a second part in which the fragile part is not formed, wherein a thickness of the first part is smaller than a thickness of the second part, wherein the lower plate is formed by joining a first layer having a first thickness and a second layer having a second thickness different than the first thickness, wherein the thickness of the first part corresponds to the first thickness, and wherein the thickness of the second part corresponds to the first and the second thickness.

2. The cooling member according to claim 1, wherein:

the fragile part has a long side and a short side, and the long side extends along a stacking direction of the battery cells.

3. The cooling member according to claim 1 wherein:

the thickness of the first part is less than or equal to half the thickness of the second part.

4. The cooling member according to claim 1, wherein:

the thickness of the first part is 0.03 to 0.07 mm.

5. The cooling member according to claim 1, wherein:

the fragile part comprises a first fragile part and a second fragile part spaced apart from the first fragile part, and a thickness of the first fragile part and a thickness of the second fragile part are equal.

6. The cooling member according to claim 1, wherein:

one of the first layer and the second layer comprises a clad metal.

7. The cooling member according to claim 1, wherein:

at least one of the upper plate, the first layer and the second layer comprises a clad metal.

8. The cooling member according to claim 1, wherein:

the first layer and the second layer are joined through a brazing process.

9. The cooling member according to claim 1, wherein:

the upper plate, the first layer and the second layer are joined through a brazing process.

10. The cooling member according to claim 1, wherein:

the upper plate comprises a bent part, a crest of the bent part overlies the first part, and a trough of the bent part overlies the second part.

11. A cooling member located in an upper part of a battery cell stack in which a plurality of battery cells are stacked, the cooling member comprising:

a lower plate where a plurality of openings are formed, a main body that provides a flow path for coolant, and a fixing member that fixes the lower plate and the main body, wherein at least one cooling hose is mounted on the main body and is located so as to correspond to an opening of the plurality of openings of the lower plate, and wherein the cooling hose is melted or fractured above a predetermined temperature or pressure.

12. The cooling member according to claim 11, wherein:

the cooling hose overlies the plurality of openings of the lower plate.

13. The cooling member according to claim 11, wherein:

the cooling hose extends in a longitudinal direction of the cooling member.

14. The cooling member according to claim 11, wherein:

the cooling hose is made of a material having a melting point of 300° C. or less.

15. The cooling member according to claim 11, wherein:

the main body is provided with a housing part for housing the cooling hose.

16. The cooling member according to claim 15, wherein:

opposite ends of the cooling hose are respectively connected to ends of the housing part.

17. The cooling member according to claim 11, wherein:

a berm extending in a longitudinal direction of the cooling member is formed at the center of the lower plate, and the main body is mounted at a position where the berm is not formed on the lower plate.

18. The cooling member according to claim 11, wherein:

the fixing member is a strap, and located in parallel with a width direction of the cooling member.

19. The cooling member according to claim 18, wherein:

the fixing member comprises end coupling parts that couple with opposite edges of the lower plate, and a central coupling part that couples with a center of the lower plate.

20. The cooling member according to claim 19, wherein:

the end coupling parts and the central coupling part have a step difference from other parts of the fixing member.

21. The cooling member according to claim 11, wherein:
the cooling member further comprises an inlet port and an outlet port for injecting coolant into and out of an inner space of the main body,
wherein the inlet port and the outlet port are connected to an external heat exchanger, and
wherein the coolant is circulated through the inlet port and the outlet port.

22. The cooling member according to claim 21, wherein:
the main body has a branched shape into portions, each portion corresponding to one of the inlet port and the outlet port.

23. A battery module comprising the cooling member according to claim 1.

24. The battery module according to claim 23, wherein:
the upper plate of the cooling member is integrated with an upper surface of a module frame forming an outer shape of the battery module.

25. A battery pack comprising the cooling member according to claim 1.

26. The battery pack according to claim 25, wherein:
the battery pack comprises a battery module having an open structure.

27. The battery pack according to claim 25, wherein:
the upper plate of the cooling member is integrated with an upper surface of a pack frame forming an outer shape of the battery pack.

* * * * *